United States Patent
Combs

(10) Patent No.: US 9,067,092 B2
(45) Date of Patent: Jun. 30, 2015

(54) COMPACT FIRE FIGHTING MONITOR

(75) Inventor: Eric Nathaniel Combs, Goshen, IN (US)

(73) Assignee: Elkhart Brass Manufacturing Company, Inc., Elkhart, IN (US)

( * ) Notice: Subject to any disclaimer, the term of this patent is extended or adjusted under 35 U.S.C. 154(b) by 779 days.

(21) Appl. No.: 12/436,422

(22) Filed: May 6, 2009

(65) Prior Publication Data

US 2009/0277656 A1 Nov. 12, 2009

Related U.S. Application Data

(60) Provisional application No. 61/051,983, filed on May 9, 2008.

(51) Int. Cl.
*A62C 31/28* (2006.01)

(52) U.S. Cl.
CPC ..................................... *A62C 31/28* (2013.01)

(58) Field of Classification Search
CPC .......... B05B 15/08; B05B 1/20; B05B 15/06; A01G 25/09; A01G 25/00; A01G 25/092; E01C 19/16; E01H 3/02; A62C 27/00; A62C 3/07; A62C 3/08; A62C 35/00
USPC ........ 239/587, 587.1, 172, 176, 587.2, 587.3, 239/587.4, 587.5; 169/24, 25, 62; 285/263
See application file for complete search history.

(56) References Cited

U.S. PATENT DOCUMENTS

| 557,799 | A | | 4/1896 | Gorter |
| 586,176 | A | * | 7/1897 | Gorter ........................... 285/263 |
| 2,011,446 | A | * | 8/1935 | Judell ................................ 4/570 |
| 4,392,618 | A | * | 7/1983 | Evans et al. ................... 239/461 |
| 4,506,738 | A | | 3/1985 | Evans et al. |
| 4,607,702 | A | | 8/1986 | Miller |
| 4,793,557 | A | * | 12/1988 | Marchese et al. .......... 239/587.3 |
| 5,425,505 | A | | 6/1995 | Jones |
| 5,624,198 | A | * | 4/1997 | Fuchs ............................. 403/76 |
| 6,095,801 | A | * | 8/2000 | Spiewak ........................ 431/344 |
| 7,137,578 | B2 | | 11/2006 | Steingass et al. |
| 7,802,630 | B2 | | 9/2010 | Combs et al. |

OTHER PUBLICATIONS

PCT Search Report mailed Dec. 4, 2009 from corresponding PCT Application No. PCT/US2009/043105.
GCC Search Report mailed Mar. 8, 2012 and Examination Report mailed Feb. 20, 2012 in related application GCC/P/2009/13438.

* cited by examiner

*Primary Examiner* — Justin Jonaitis
(74) *Attorney, Agent, or Firm* — Faegre Baker Daniels LLP

(57) ABSTRACT

A fire fighting monitor includes a first pipe having an inlet and an outlet and a passageway with a central axis. The passageway extends from the inlet to the outlet and has a curved portion wherein the outlet directs the flow of fluid in a direction angled to the flow of fluid into the inlet. The monitor includes a second pipe mounted about the outlet of the first pipe, which is pivotally mounted about a pivot axis, which is located at the outlet of the first pipe. The second pipe also has an outlet in fluid communication with the outlet of the first pipe and is pivotal about the pivot axis over a range of motion greater than 90°.

32 Claims, 23 Drawing Sheets

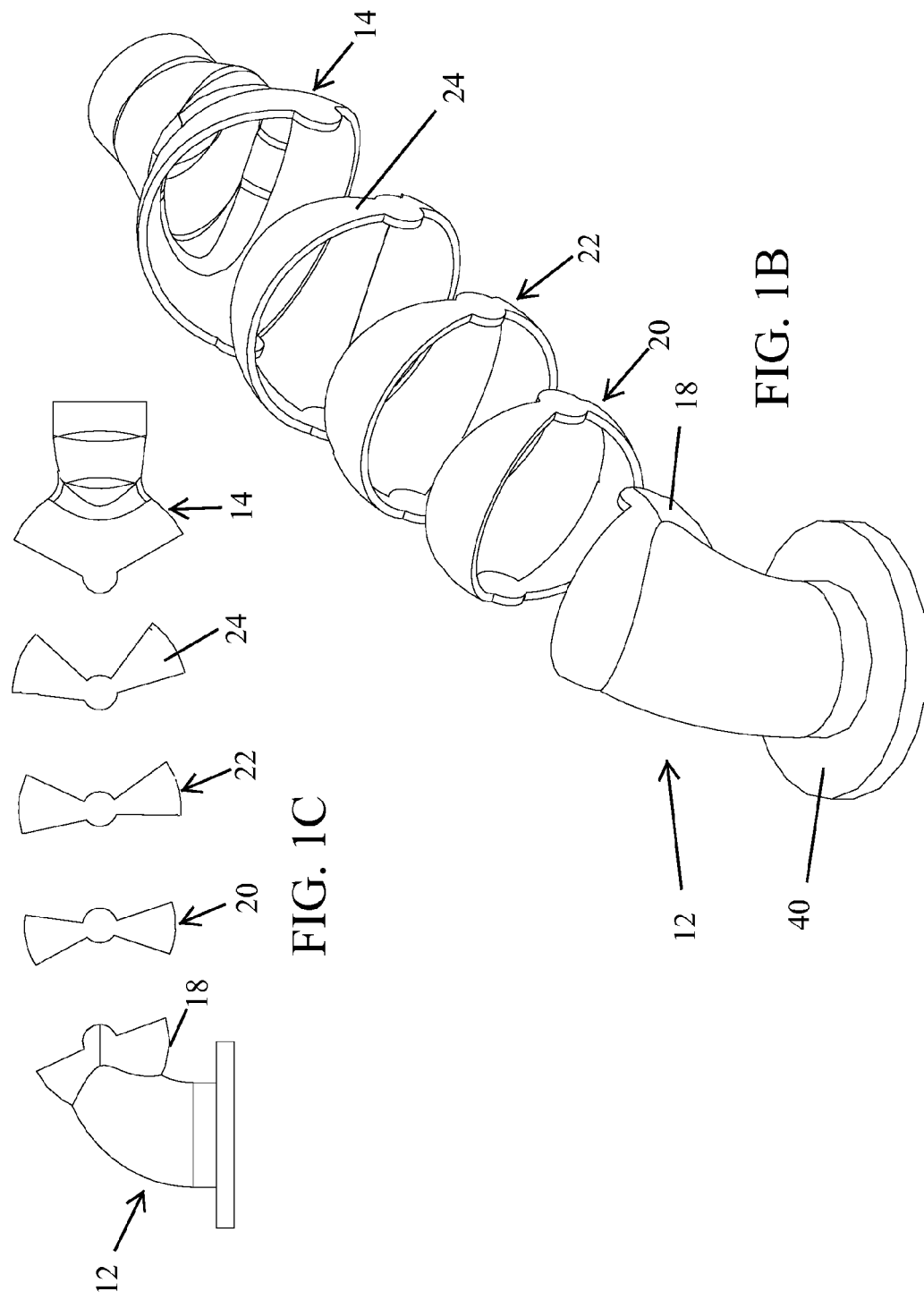

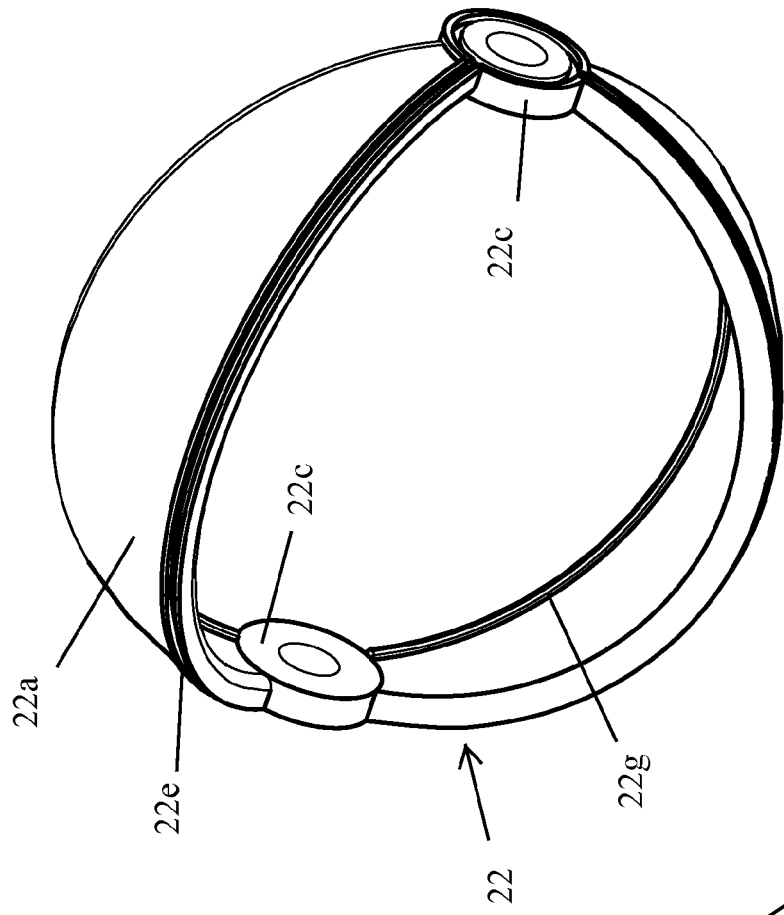
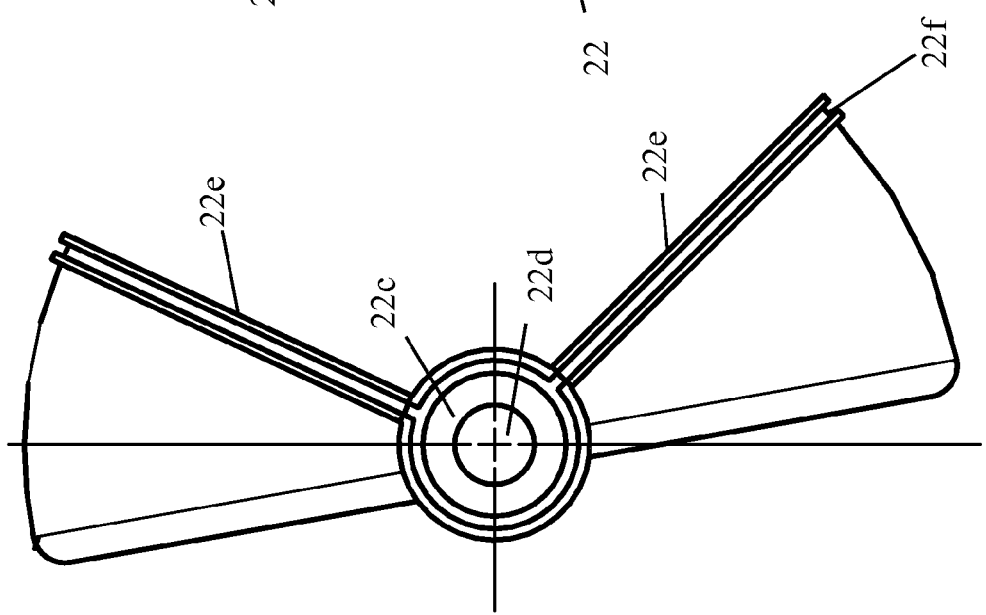
FIG. 19
FIG. 20

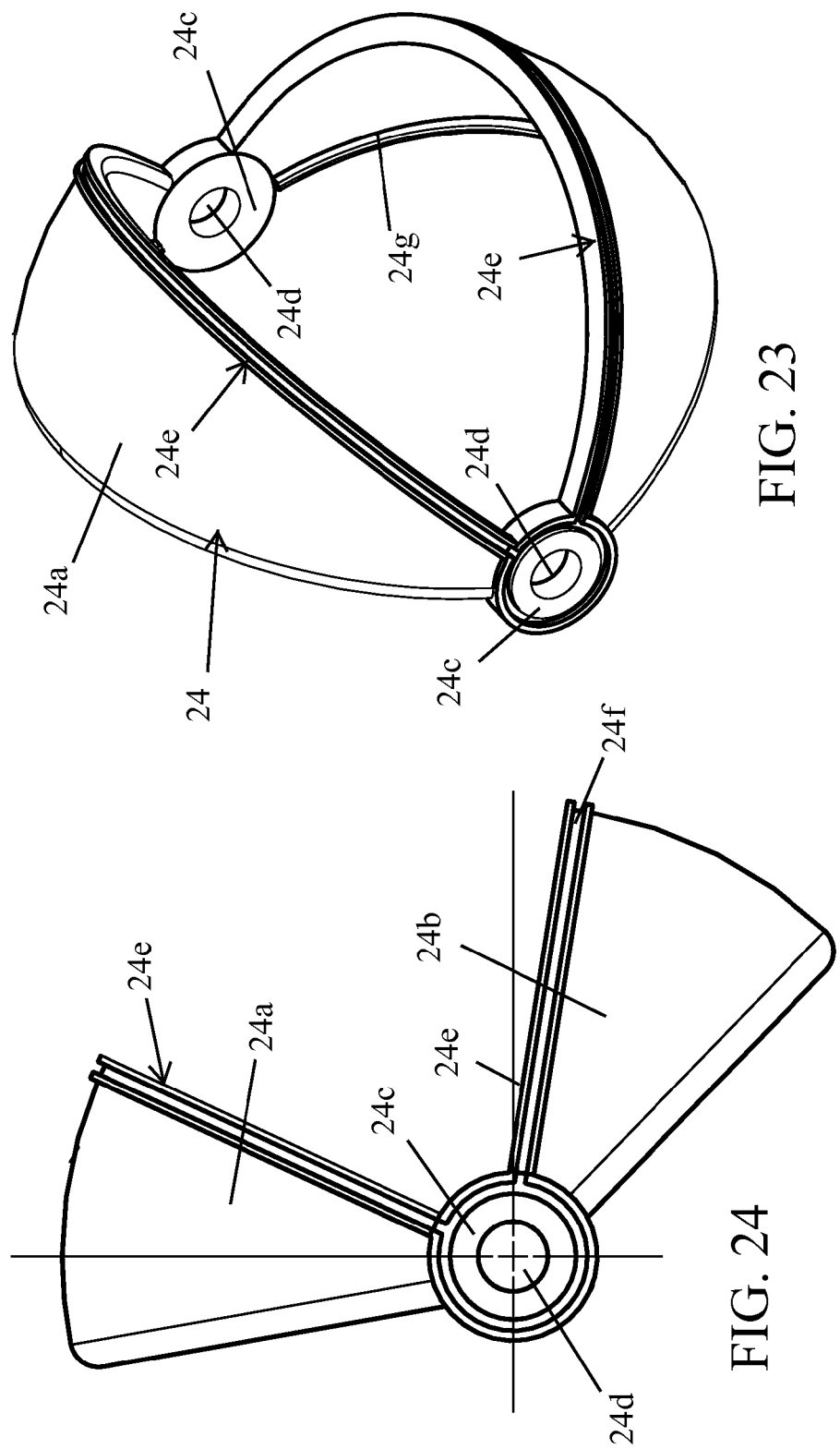

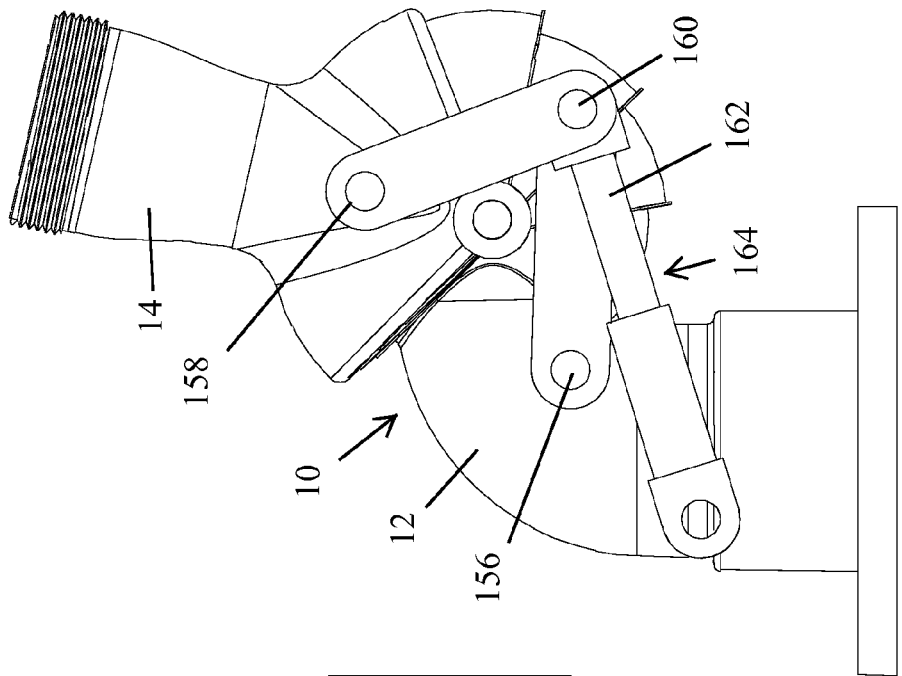
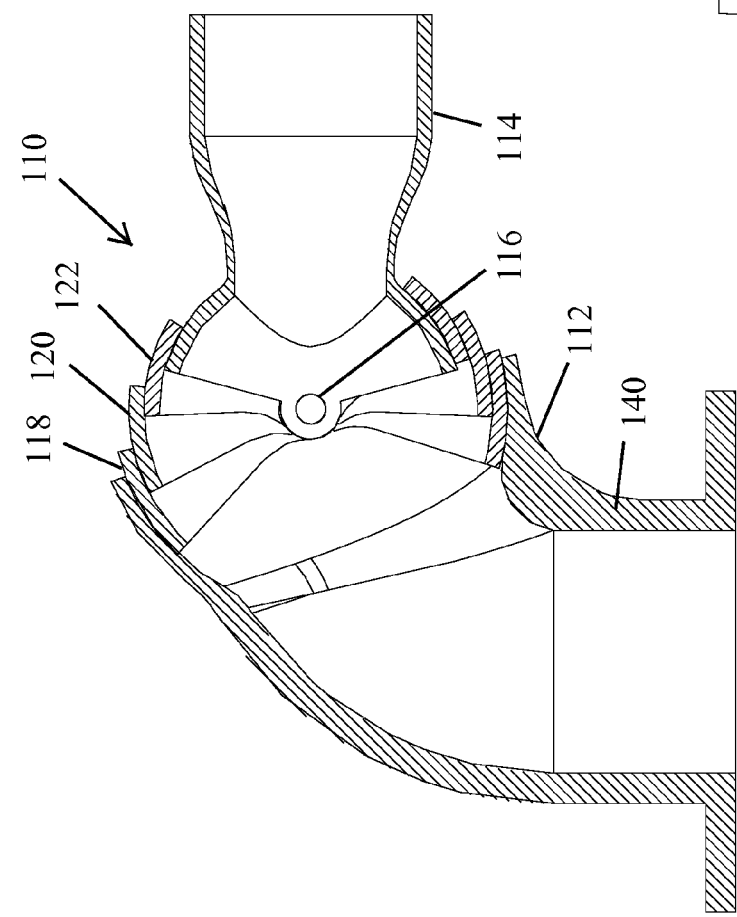

COMPACT FIRE FIGHTING MONITOR

The present application claims the benefit of provisional application Ser. No. 61/051,983, filed May 9, 2008, entitled COMPACT FIRE FIGHTING MONITOR, which is incorporated by reference in its entirety herein.

TECHNICAL FIELD AND BACKGROUND OF THE INVENTION

The present invention relates to a fire fighting monitor and, more particularly, to a fire fighting monitor that may be formed using injection molding and, further, which reduces the friction losses in the fluid flowing through the monitor.

SUMMARY OF THE INVENTION

Accordingly, the present provides a fire fighting monitor that may be configured to produce an increased flow efficiency over a standard fire fighting monitor and, further, to have a more compact configuration to reduce the overall size of the monitor. One or more of the monitor's components may be molded from various materials, including plastics or metals, so that the need for machining may be eliminated or reduced. For example, one or more components of the monitor of the present invention may be formed using injection molding and may be molded from plastic, reinforced polymers, including composite materials, such as glass filled nylon, which may reduce the weight and cost of the monitor. Furthermore, by forming the monitor from a non-corroding material, the monitor of the present invention may have improved corrosion resistance over prior art monitors.

In one form of the invention, a fire fighting monitor includes a first pipe and a second pipe mounted about the outlet of the first pipe. The first pipe has a central passageway with a central axis, with the passageway extending from the inlet to the outlet, and with the passageway having a curved portion wherein the outlet redirects flow of the fluid in a direction angled to the flow of the fluid into the inlet of the monitor. The second pipe is pivotally mounted about a pivot axis, with the pivot axis provided at the outlet of the first pipe. Further, the second pipe includes an outlet in fluid communication with the outlet of the first pipe and is pivotally mounted about the pivot axis over a range of motion greater than 90°.

In one aspect, the outlet of the first pipe includes a spherical body, with the second pipe including a spherical body for mounting to the first pipe.

In a further aspect, the spherical body of the second pipe has an inner diameter, which is greater than the outer diameter of the spherical body of the first pipe, with the spherical body of the second pipe mounted about the spherical body of the first pipe. Alternately, the inner diameter of the second pipe may be smaller than the outer diameter of the first pipe body.

In yet other aspects, the fire fighting monitor further includes a spherical body interposed between the second pipe and the first pipe. For example, the monitor may include a plurality of overlapping spherical bodies interposed between the first and second pipes, which form a pivot joint between the first pipe and the second pipe. Again, the overlapping spherical bodies can be arranged with increasing diameters or decreasing diameters.

According to yet other aspects, the outlet of the second pipe is pivotal about the pivot axis over a range of motion greater than 120°, and optionally over a range of motion greater than 135°, and optionally up to about 150°.

In another form of the invention, a fire fighting monitor includes a housing and a nozzle mounted to the outlet of the housing. The housing has a passageway with a central axis and a single generally horizontal pivot axis, with the passageway extending from the inlet to the outlet. The passageway has a curved portion wherein the outlet directs the flow of fluid in a direction angled to the generally vertical pivot axis of the inlet, and with the outlet being pivotal about a single generally horizontal pivot axis over a range of motion greater than 90°. In this manner, the nozzle is pivotal about the single generally horizontal pivot axis and is pivotal with the outlet over the same range of motion.

In one aspect, the outlet is pivotal about the pivot axis over a range of motion greater than 120° and, optionally, over a range of motion greater than 135°. Further, the outlet may be pivotal about the pivot axis over a range of motion up to about 150°.

According to yet another aspect, the housing includes a first pipe and a second pipe, with the first pipe including an inlet and the second pipe providing the outlet. Further, the monitor may include a plurality of overlapping spherical bodies interposed between the second pipe and the first pipe, which form a pivot joint between the first and second pipes.

According to yet another form of the invention, a fire fighting monitor includes a housing with a curved passageway and with a central axis and a movable outlet having a linear passageway in fluid communication with and pivotally mounted about the curved passageway. A nozzle is mounted about the movable outlet with the curved passageway and linear passageway forming a flow path through the monitor to the nozzle having a single bend to thereby reduce friction loss in the fluid flowing through the monitor.

In yet another form of the invention, a fire fighting monitor includes a housing with a movable outlet and a nozzle mounted about the movable outlet, with the housing formed from one or more molded components.

In one aspect, the one or more molded components comprises a component molded from a plastic material, such as a composite material, including a reinforced nylon, such as a glass filed nylon. Various molding methods may be used to form the components, such as any permanent mold process. Alternately, the one or more molded components comprises a component molded from a metal, such as a powered metal or an investment cast metal.

Accordingly, the present invention provides a fire fighting monitor with a passageway with a reduced number of bends over a conventional monitor and, further, which can be configured to have a reduced height, arranged to have a more compact configuration and lighter weight than conventional monitor. Further, the monitor of the present invention may be formed from molded components, thus, to provide a lighter weight monitor and, further, a monitor that is corrosion resistant.

These and other objects, advantages, purposes, and features of the invention will become more apparent from the study of the following description taken in conjunction with the drawings.

DETAILED DESCRIPTION OF THE DRAWINGS

FIG. 1B is an exploded perspective view of the monitor of FIG. 1;

FIG. 1C is another exploded perspective view of the monitor of FIG. 1;

FIG. 19 is a perspective view of another one of the spherical bodies that forms part of the pivot joint of the monitor;

FIG. 20 is a side elevation view of the spherical body of FIG. 19;

FIG. 23 is a perspective view of a third spherical body forming the pivot joint of the monitor;

FIG. 24 is a side elevation view of the spherical body of FIG. 23;

FIGS. 32-34 illustrate the motion of the outlet and the configuration of the actuator as the outlet moves from a lowered position through an intermediate position to a raised position;

FIG. 35 is a cross sectional view taken of another embodiment of the monitor of the present invention;

DETAILED DESCRIPTION OF THE PREFERRED EMBODIMENTS

Figure 1:
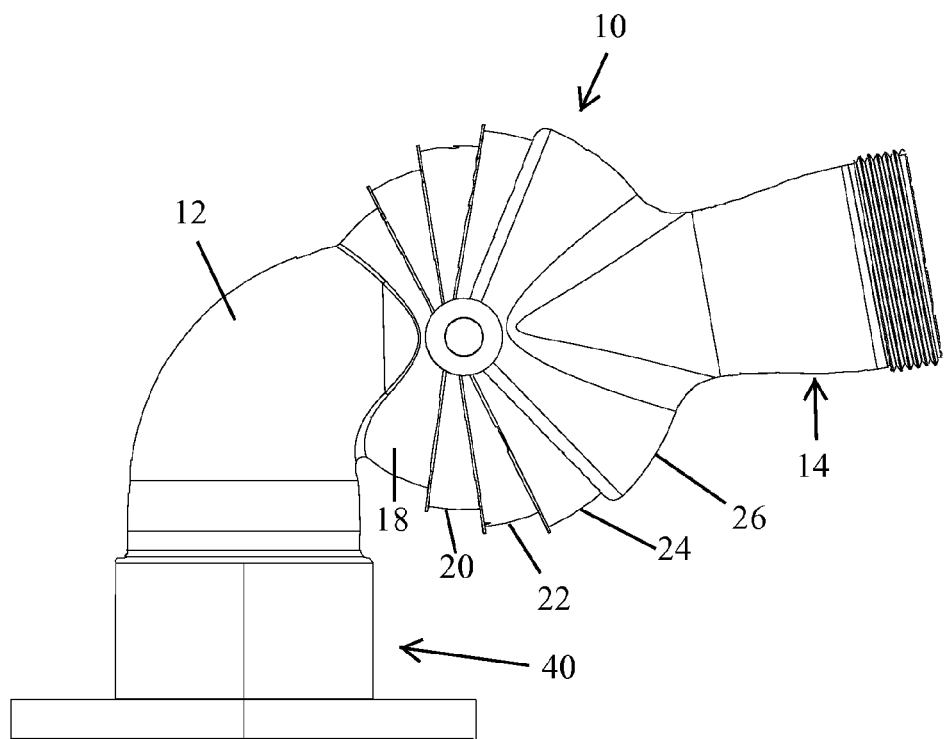
FIG. 1 is a perspective view of a monitor of the present invention.
Figure 2:
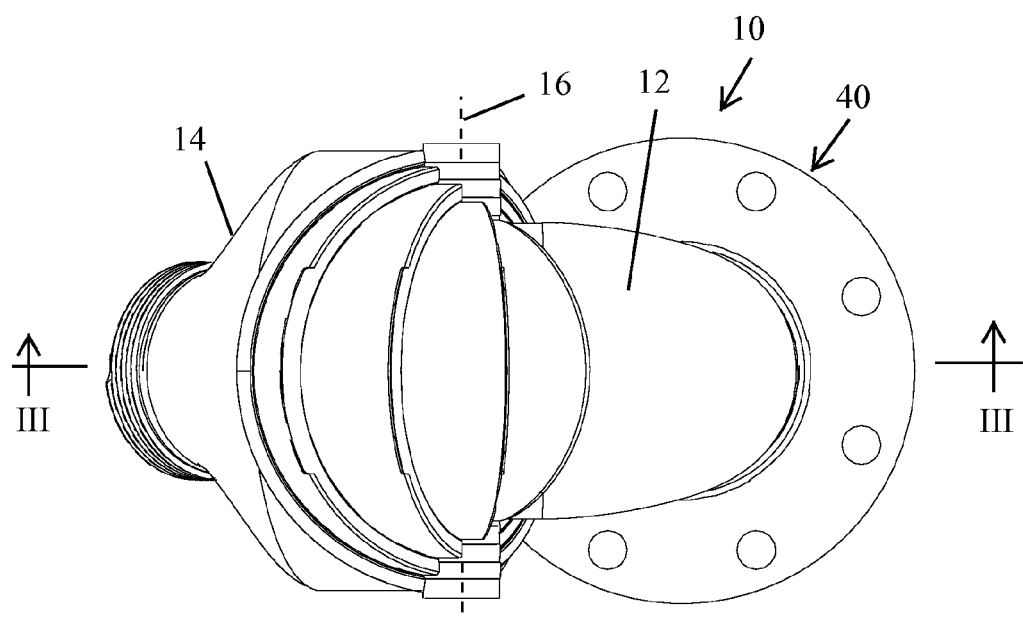
FIG. 2 is a top plan view of the monitor of FIG. 1.
Figure 1A:
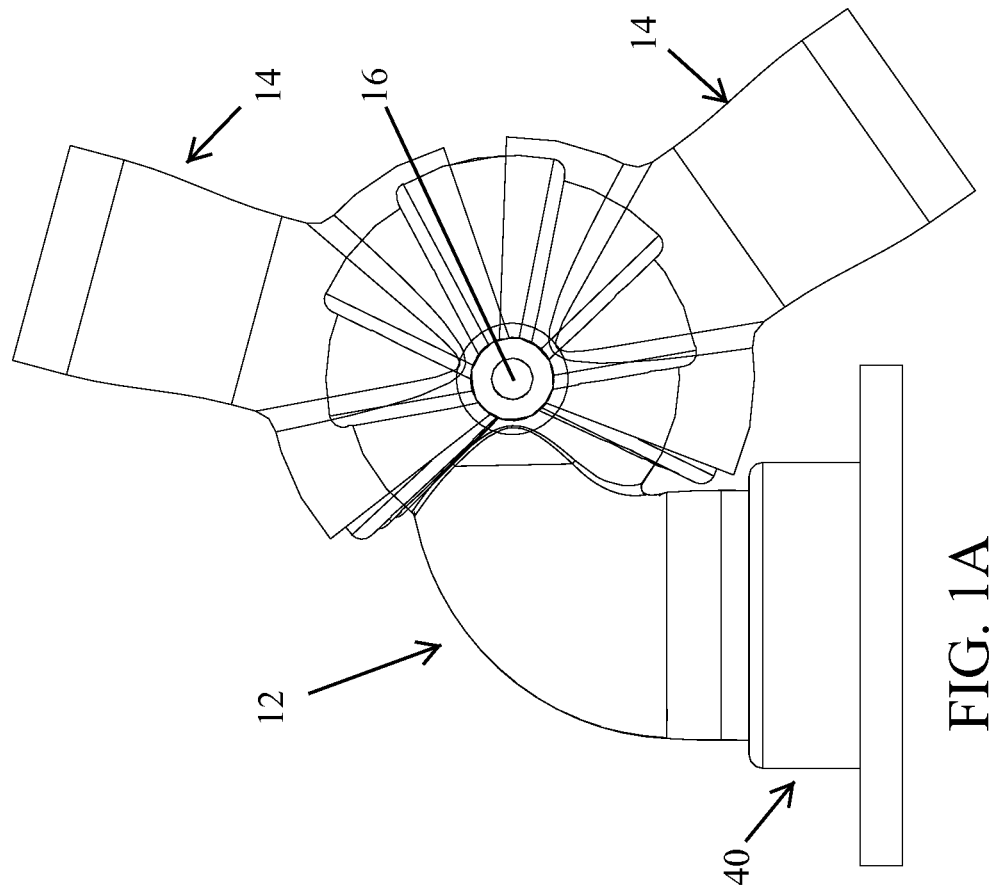
FIG. 1A is a side elevation the monitor of FIG. 1.
Figure 3:
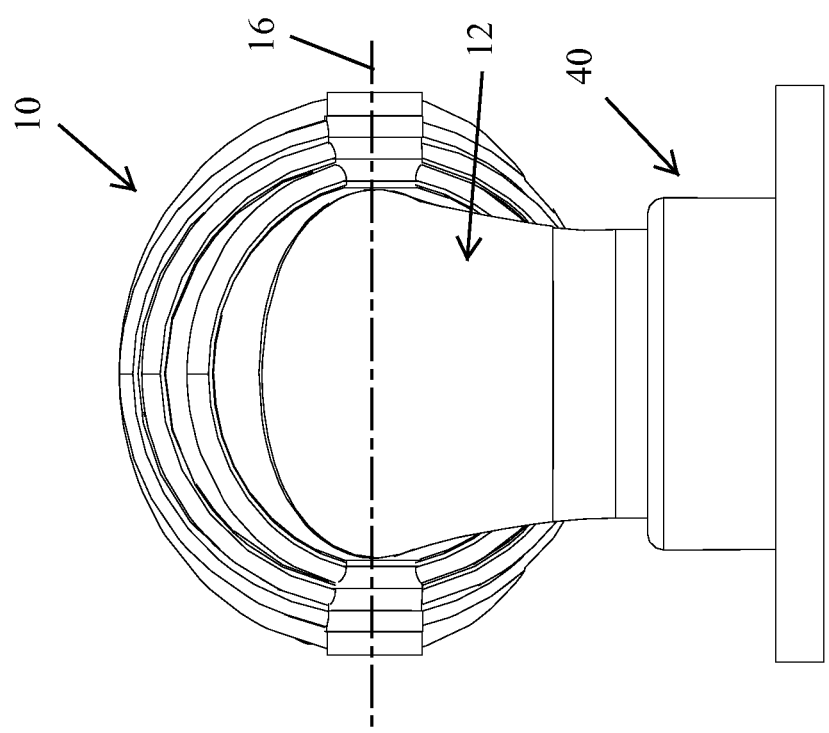
FIG. 3 is a rear elevation view of the monitor of FIG. 1.

Referring to FIG. 1, the numeral 10 generally designates a fire fighting monitor of the present invention. As will be more fully described below, fire fighting monitor 10 is configured to have a more compact arrangement than a conventional fire fighting monitor of the same flow rate and, further, to provide a passageway with a reduced number of bends to reduce the friction and energy loss of the fluid flowing through the monitor to thereby increase the flow efficiency of the fluid through the monitor. Further, the monitor is configured to provide a compact arrangement and, further, may be assembled from molded components, such as components molded from metal or plastic, including composite materials, which reduces the weight of the monitor, potentially the cost of the monitor, and, when molded from plastic, potentially improves the corrosion resistance of the monitor. In addition, the present invention may be assembled from components that do not need machining.

Figure 4:
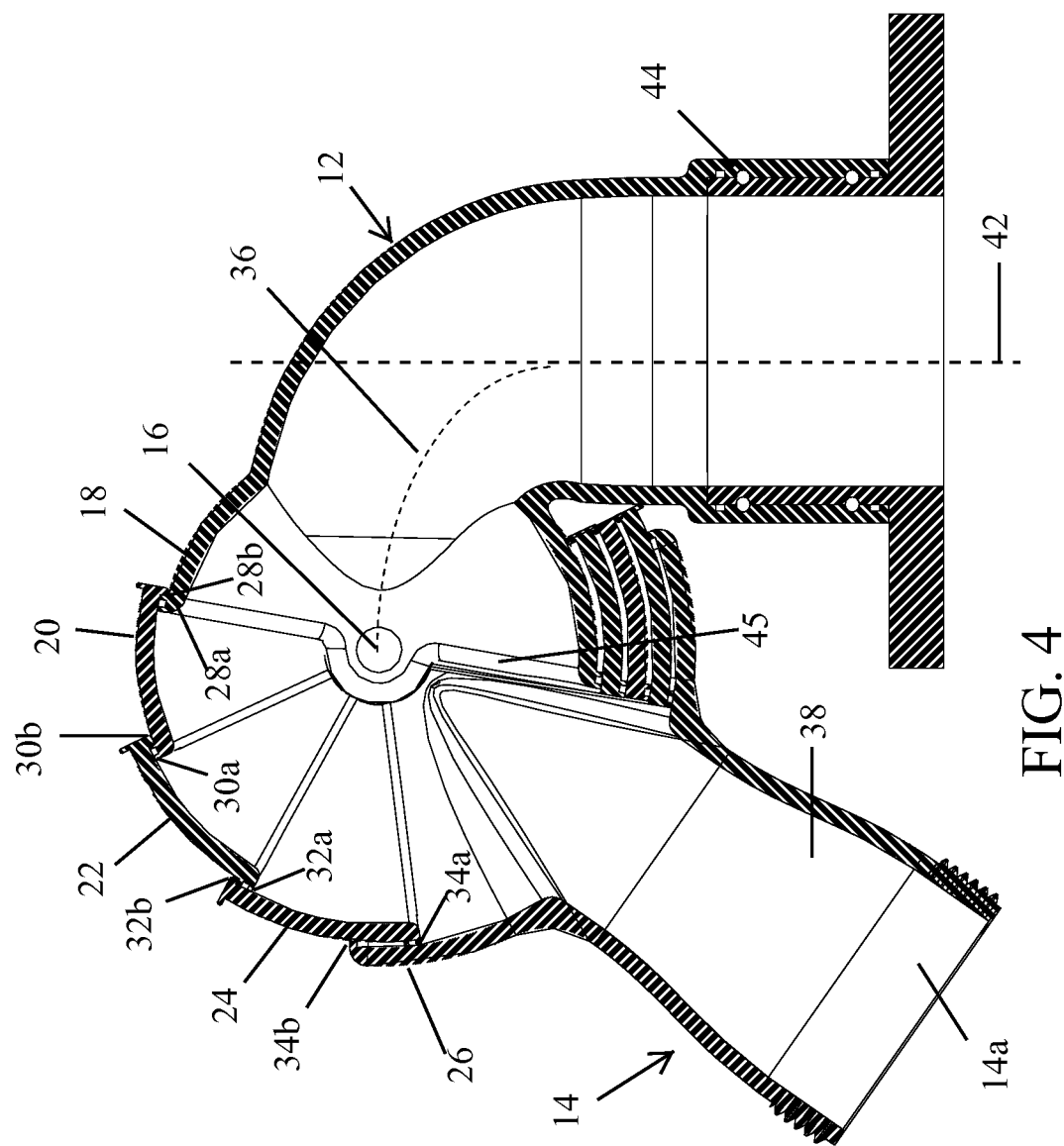
FIG. 4 is a cross-section view taken along line IV-IV of FIG. 3.
Figure 5:
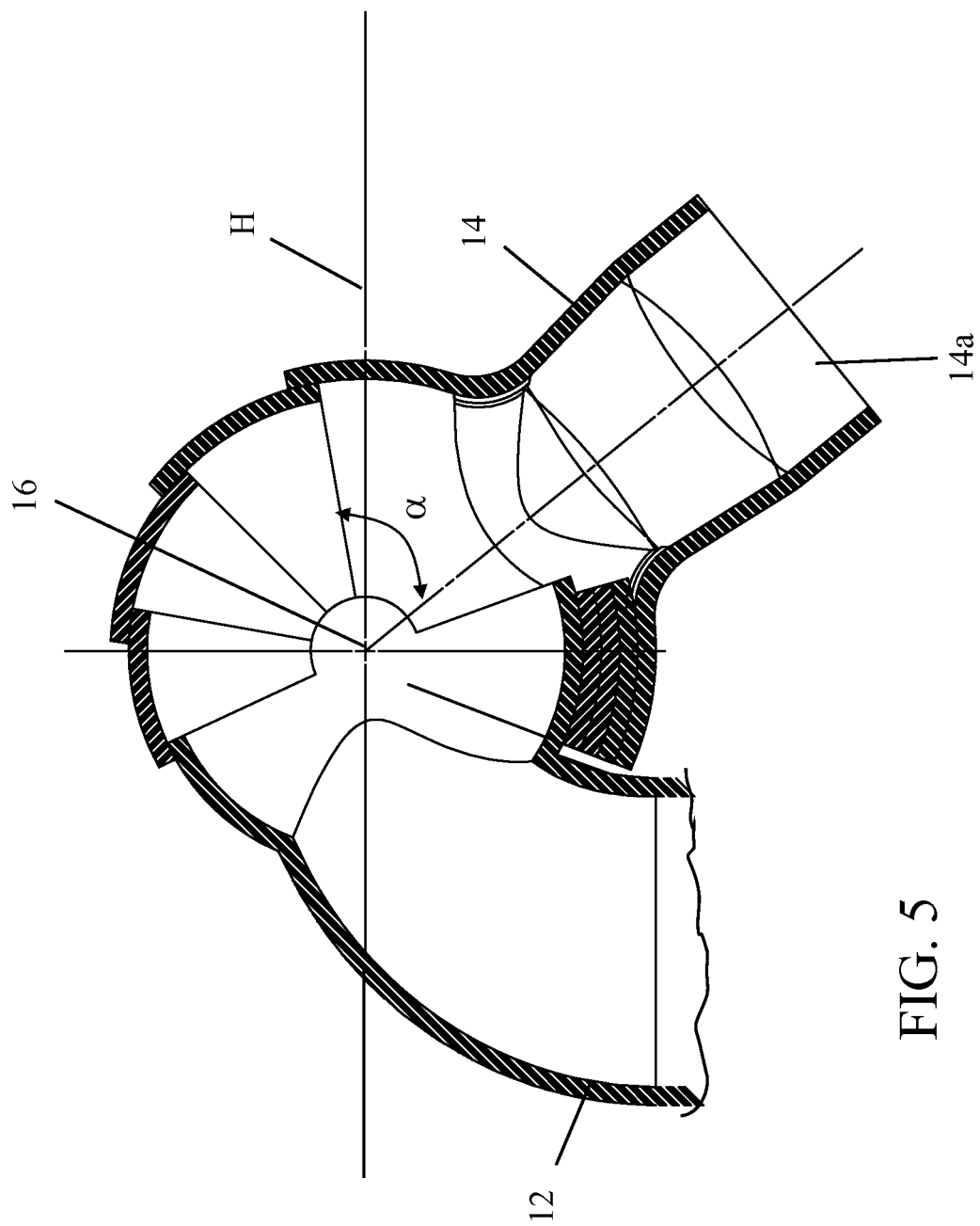
FIG. 5 is a partial cross-section view similar to FIG. 4 illustrating the outlet of the monitor in its lowered position.
Figure 6:
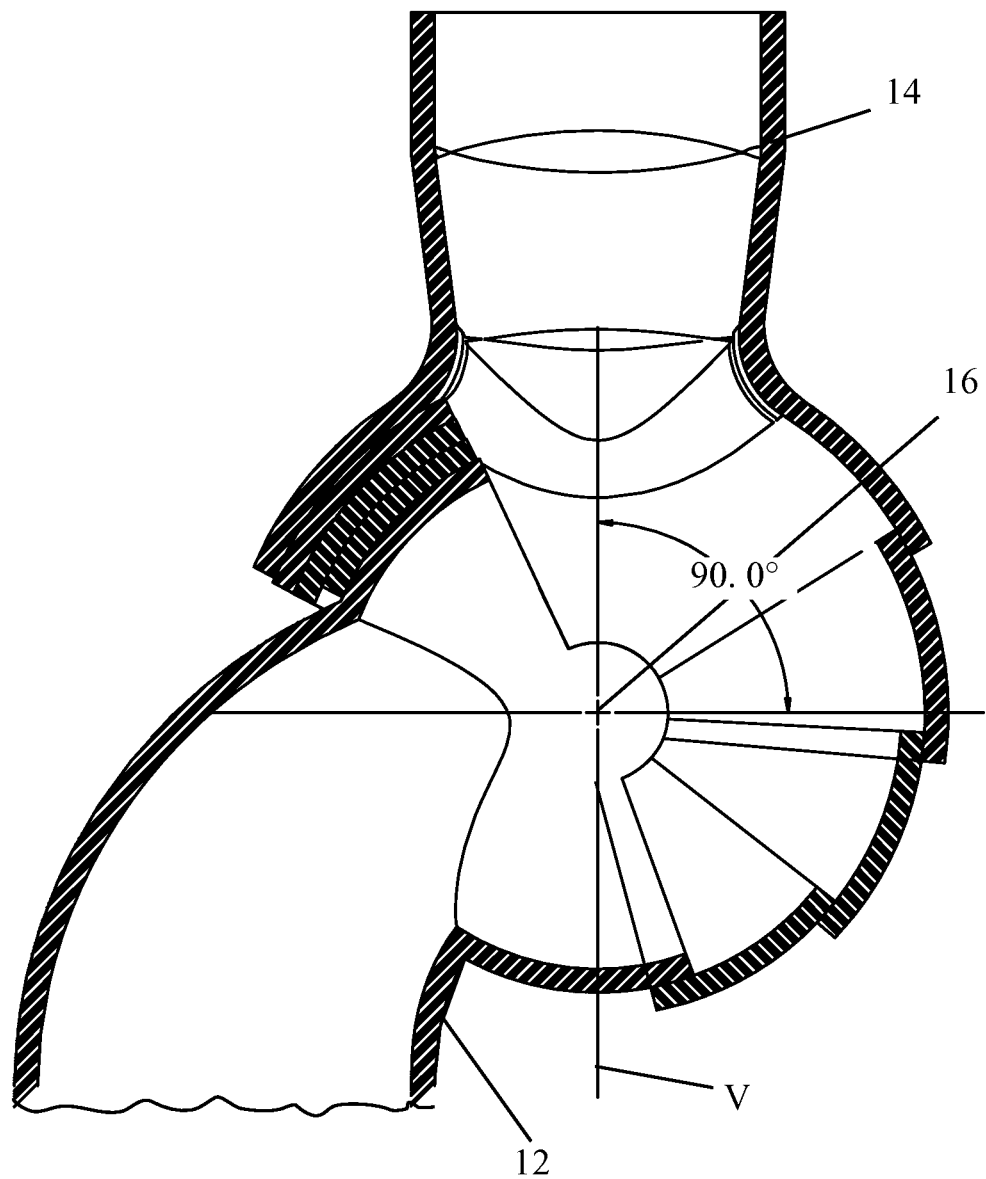
FIG. 6 is a similar cross-section to FIG. 5 illustrating a fully raised position of the monitor outlet.

As best seen in FIGS. 2-6, monitor 10 includes a housing formed from a first pipe section 12 and a second pipe section 14, which is pivotally mounted relative to pipe section 12 about a pivot axis 16. Second pipe section 14 provided a mounting surface for mounting a nozzle (not shown) to the monitor. As best seen in FIGS. 5 and 6, pipe section 14, which forms the outlet of the monitor, may be pivoted between a lowered position as shown in FIG. 5 at an angle α of about 60° below horizontal axis H and raised to a position, such as shown in FIG. 6, which is generally orthogonal (or is at angle or about 90° above) the horizontal axis or generally parallel with respect to vertical axis V. In this manner, the outlet formed by pipe section 14 may be pivoted over a range of greater than 90°, optionally over a range greater than 135°, and, further, up to approximately 150° with a single pivot axis.

Referring again to FIG. 4, pipe section 14 is mounted about axis 16 by a plurality of spherical bodies 18, 20, 22, 24, and 26, which form a single horizontal pivot joint for monitor 10 and enable the range of motion described above. Spherical body 18 is formed at the outlet end of pipe section 12, while spherical body 26 is formed at the inlet end of pipe section 14. Spherical bodies 18, 20, 22, 24, and 26 are nested and overlap and are sealed by seals 28a, 30a, 32a, and 34a, such as o-ring seals, provided on their outwardly facing surfaces, respectively, such that their inwardly facing surfaces form the critical sealing surfaces.

When pipe section 14 is in its fully lowered position as shown in FIG. 5, each of the spherical bodies will have their respective lower wall sections aligned so they assume a generally stacked arrangement, such as shown in FIG. 5, and with the upper wall sections fanned out but still over lapping to form the upper outer curved wall of the monitor. Similarly, when pipe section 16 is in its fully raised position, the upper wall sections of each of the spherical bodies will be aligned and in a stacked arrangement with their opposed wall sections fanned out but overlapping at their respective edges to form a seal between the respective spherical bodies.

As will be understood form FIGS. 4-6, pipe sections 12 and 14 form a passageway with a curved section 36 and a generally linear section 38, which are in fluid communication to form a passageway through the monitor, with only a single bend. Though when pipe 14 is pivoted to its fully raised position, the passageway may have two bends. By providing two or less bends, the monitor of the present invention exhibits reduced friction loss in the fluid flowing through the monitor.

Optionally, as best seen in FIG. 4, pipe section 12 may be rotatably mounted in a base 40 to allow the monitor 10 to be rotated about a generally vertical axis 42. Further, as best seen in FIG. 4, pipe section 12 is mounted in base 40 by a plurality of ball bearing 44 to allow monitor and, further, outlet 14 to rotate 360° about vertical axis 42.

Figure 8:
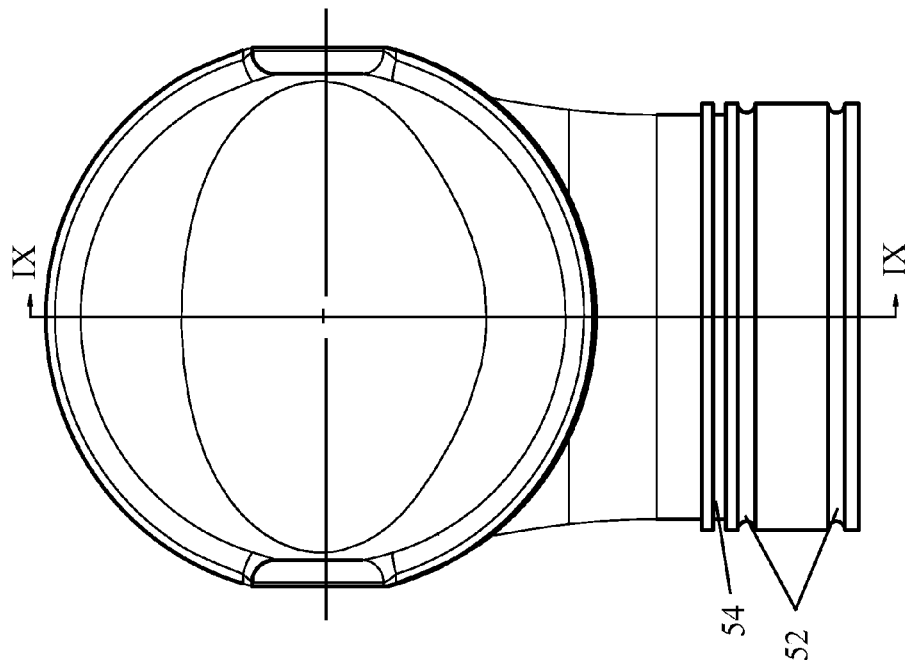
FIG. 8 is another elevation view of the first pipe section of the monitor.
Figure 7:
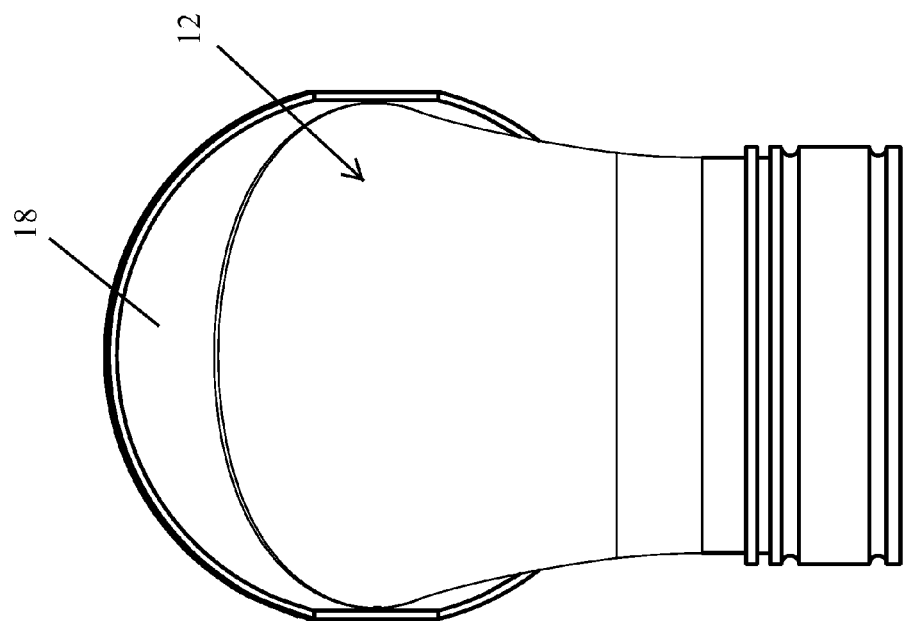
FIG. 7 is an elevation view of a first pipe section of the monitor body.
Figure 9:
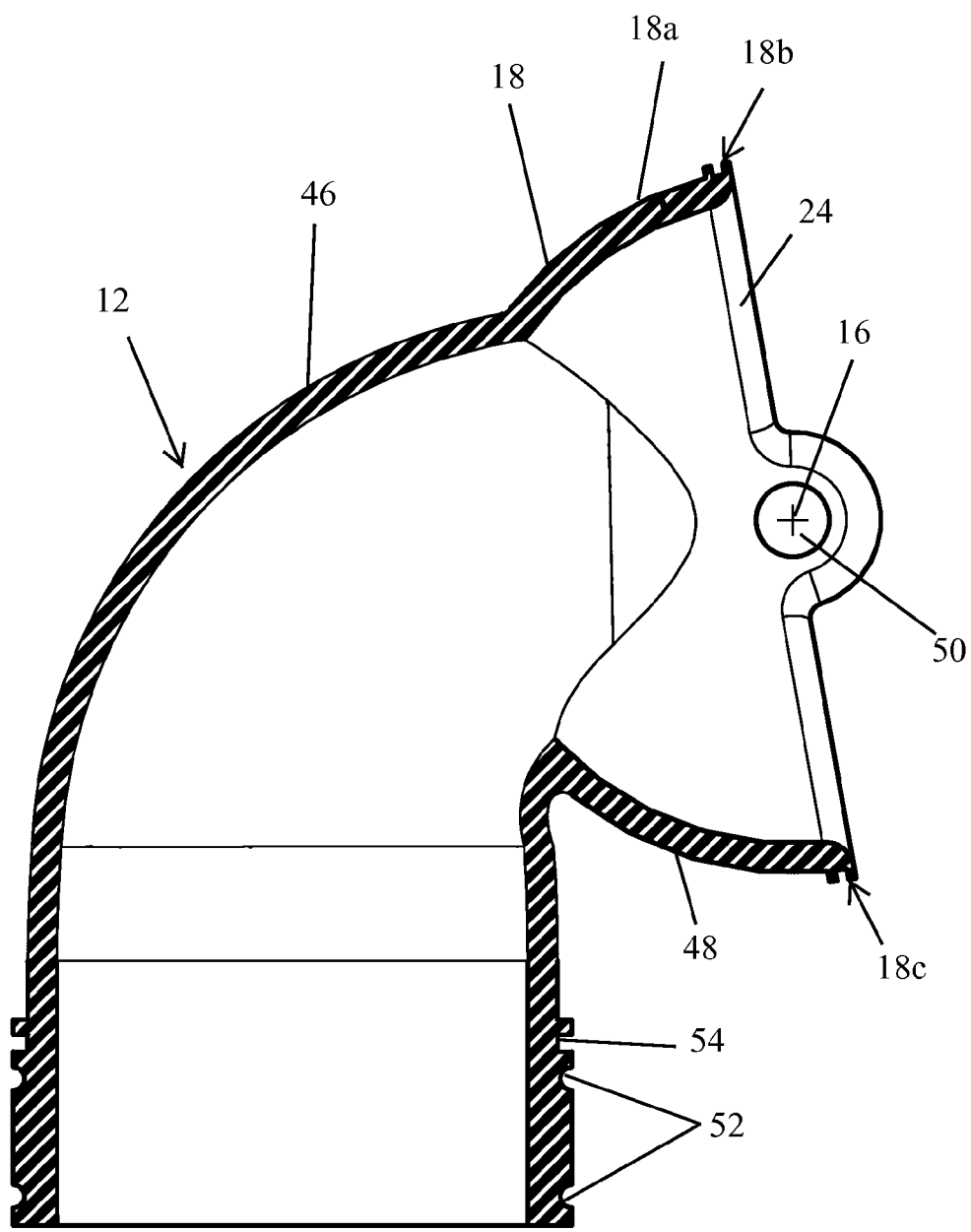
FIG. 9 is a cross-sectional view taken along line IX-IX of FIG. 8.
Figure 10:
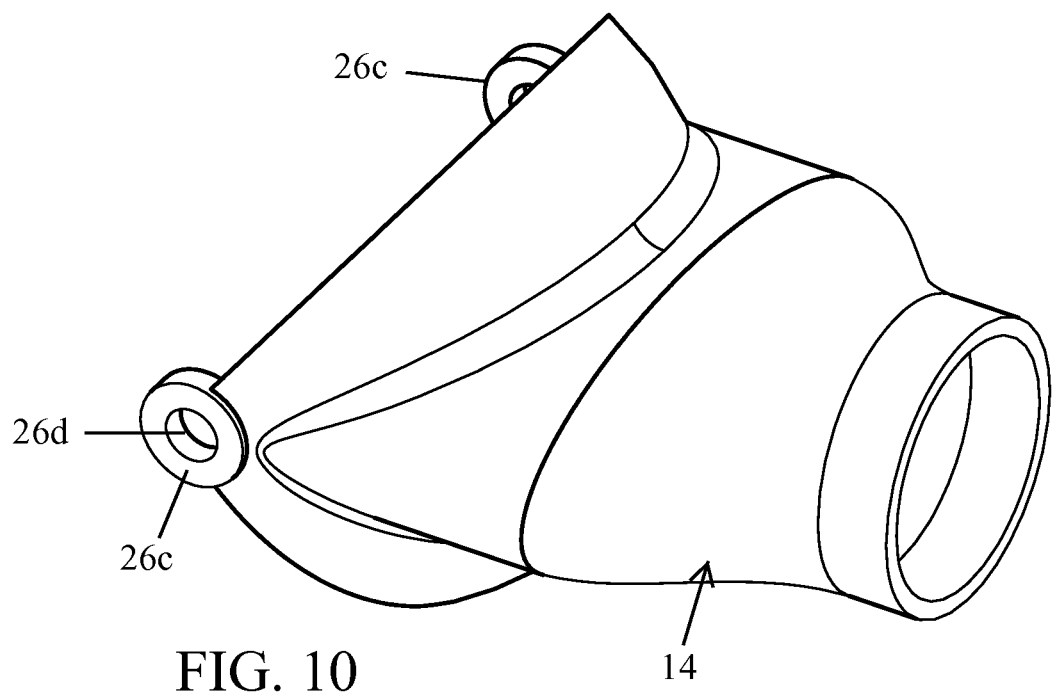
FIG. 10 is a perspective view of a second pipe section or outlet pipe of the monitor.
Figure 11:
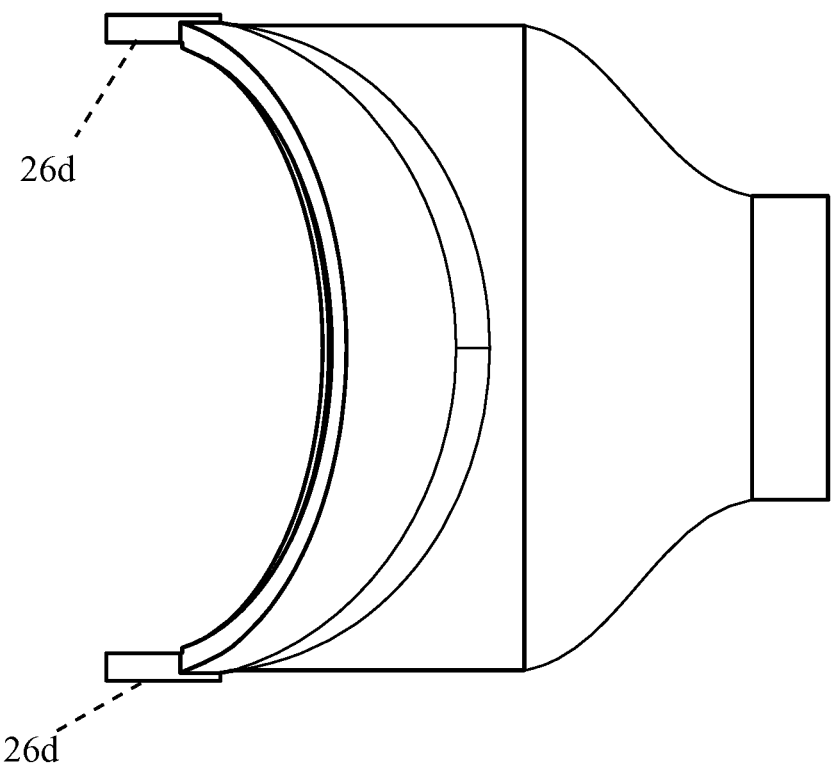
FIG. 11 is a top plan view of the outlet pipe of FIG. 10.
Figure 12:
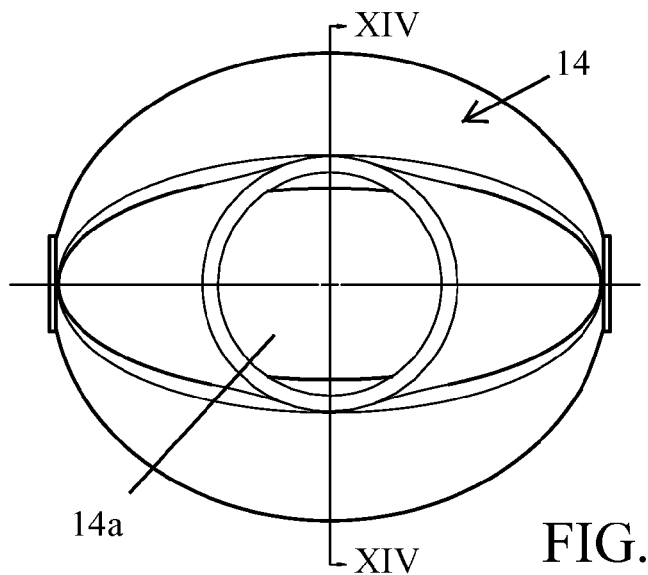
FIG. 12 is an elevation view of the outlet pipe of FIG. 10.
Figure 13:
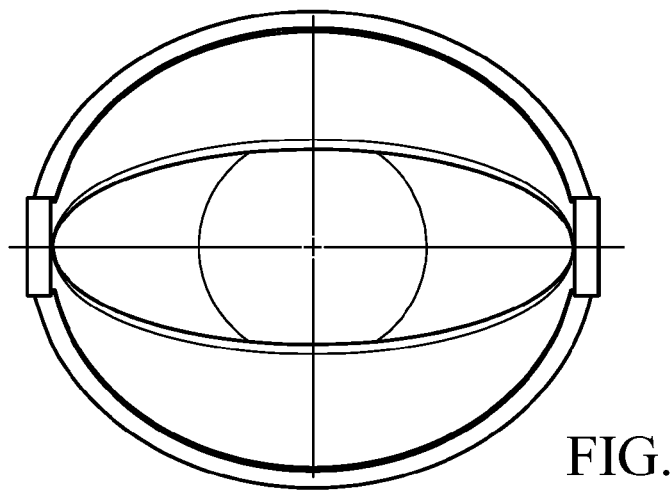
FIG. 13 is another elevation view of the outlet pipe of FIG. 10.
Figure 14:
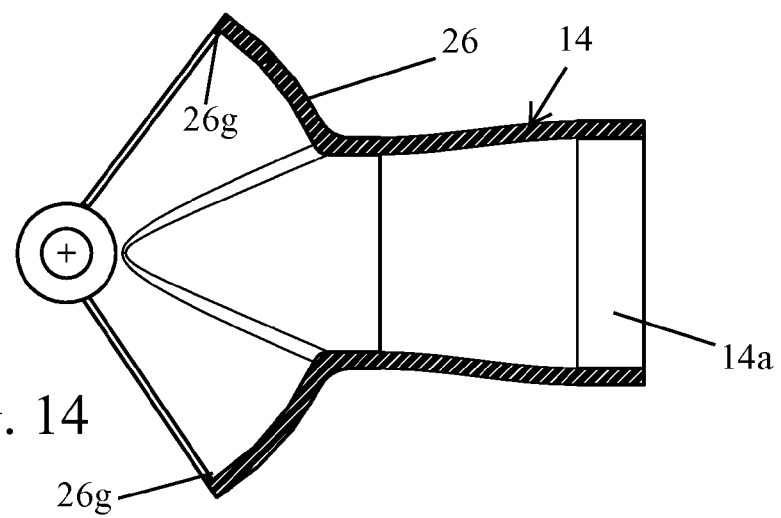
FIG. 14 is a cross-sectional view taken along line XIV-XIV of FIG. 12.
Figure 16:
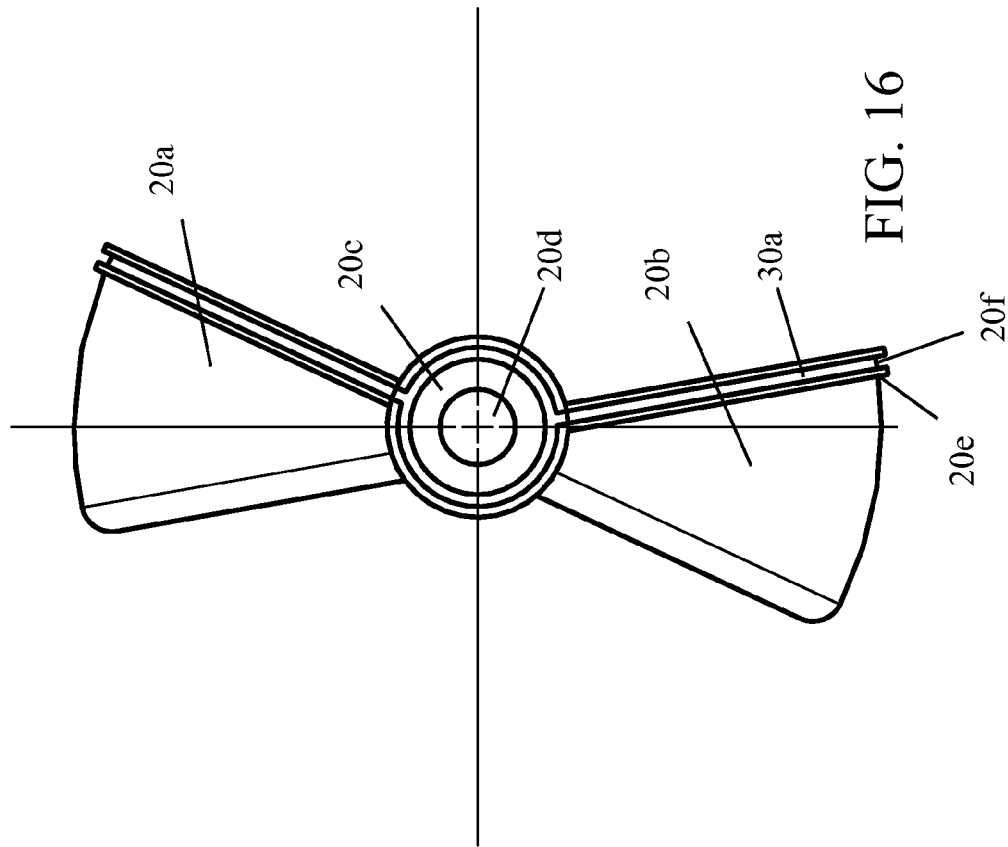
FIG. 16 is a side elevation view of the spherical body of FIG. 15.
Figure 15:
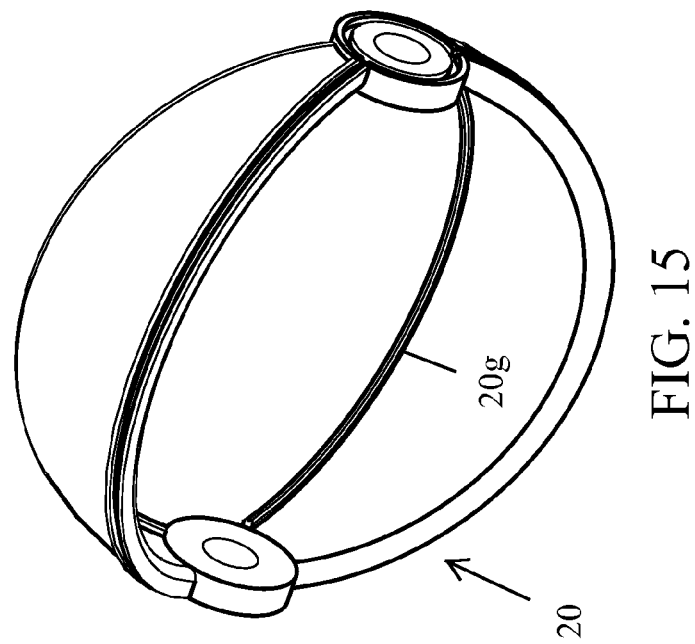
FIG. 15 is a perspective view of one of the spherical bodies that forms part of the pivot joint of the monitor.
Figure 17:
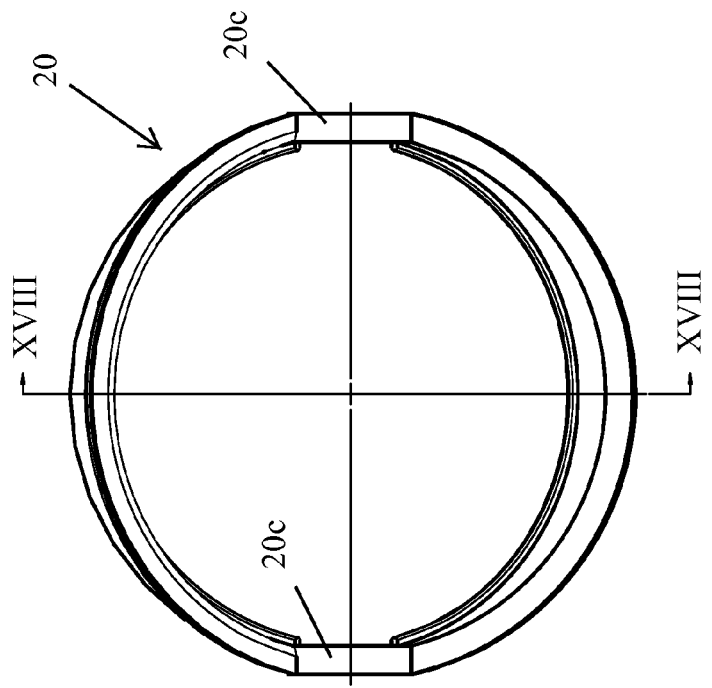
FIG. 17 is a front elevation view of the spherical body of FIG. 15.

Referring to FIGS. 7-8, pipe section 12 includes a first curved pipe portion 46 and as previously noted a spherical body 18. Spherical body 18 includes a wall 48 with two opposed transverse openings 50 through which pivot pins or bolts extend for forming pivot axis 16 and thereby pivotally mount the respective spherical members and pipe section 14 about pipe section 12. Lower end of pipe section 12 is formed with a pair of raceways 52 for receiving bearings 44 and, further, a recess 54 for receiving a seal, such as an o-ring seal. In this manner, as previously noted, when pipe section 12 is mounted in base 40, pipe section 12 is free to rotate about axis 42 and, further, to provide a sealed interface with base 40. As best seen in FIG. 9, pivot axis 16 is located at outlet 45 of pipe section 12. Further, outer surface 18a of spherical body 18 includes a projecting rib 18b with a recess 18c for retaining seal 28a.

Figure 18:
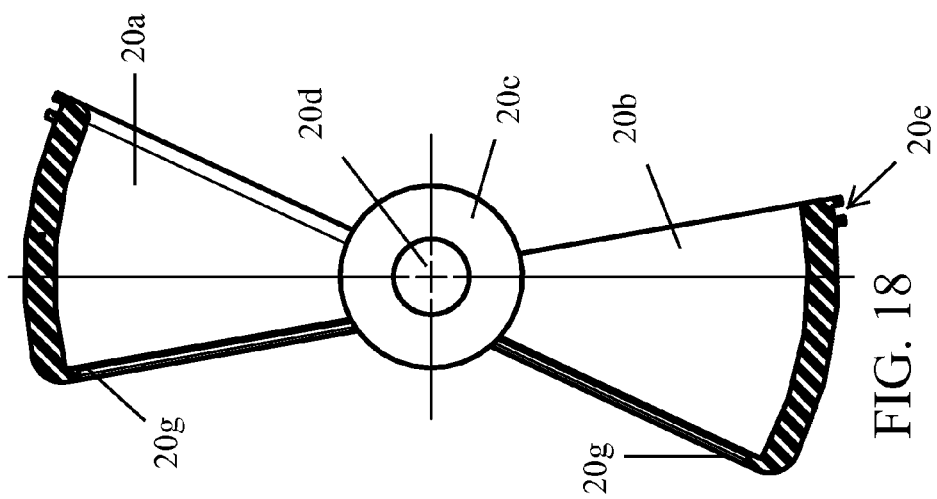
FIG. 18 is a cross-section view taken along line XVIII-XVIII of FIG. 17.
Figure 21:
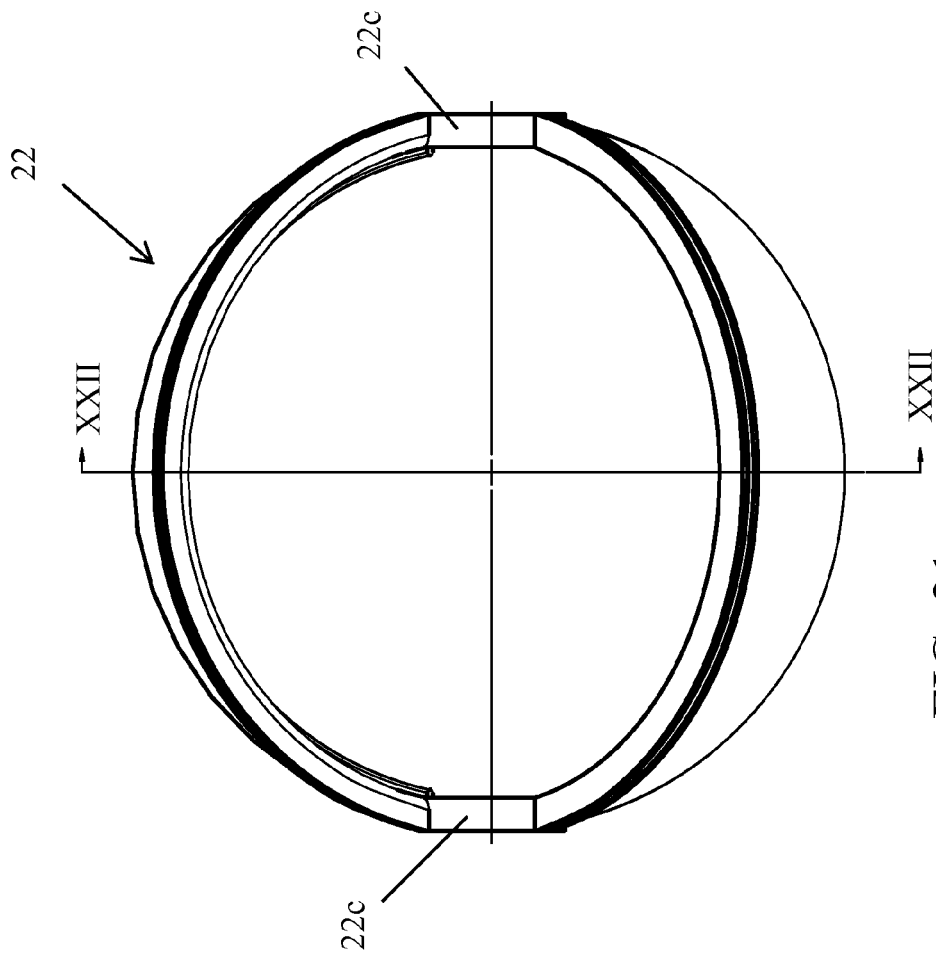
FIG. 21 is a front end elevation view of the spherical body of FIG. 19.

Referring to FIGS. 15-18, the first spherical body 20 that mounts to spherical body 18 is formed from a pair of spherical sections 20a and 20b, which are joined by a pair of annular members 20c, each with a central opening 20d. Openings 20d aligned with openings 50 and are secured thereto by pivot bolts to allow spherical body 20 to be mounted about spherical body 18. Furthermore, similar to spherical body 18, spherical body 20 includes a raised rib 20e extending along spherical sections 20a and 20b with a recess 20f for receiving seal 30a. As best seen in FIG. 18, each circle sector 20a and 20b includes an inwardly projecting lip 20g, which provide stops when abutted against rib 18b on spherical member 18.

Figure 22:
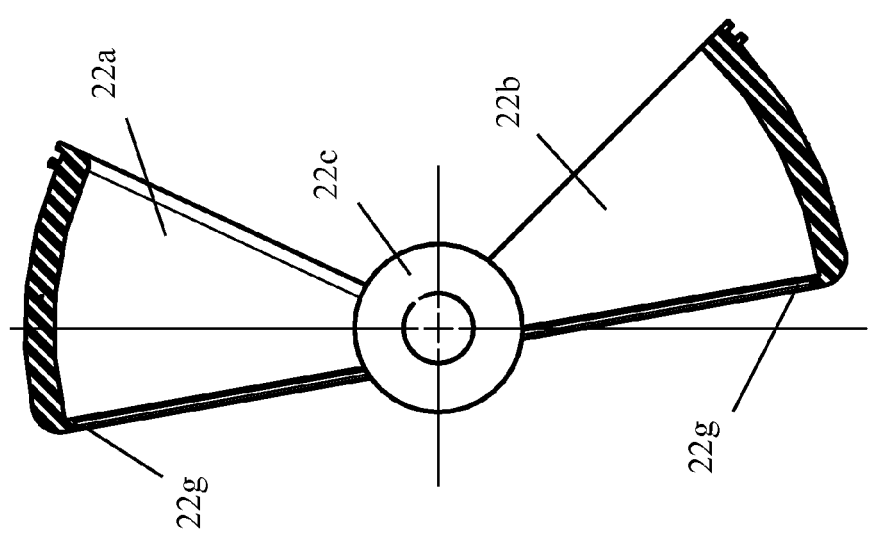
FIG. 22 is a cross-section view taken along line XXII-XXII of FIG. 21.
Figure 25:
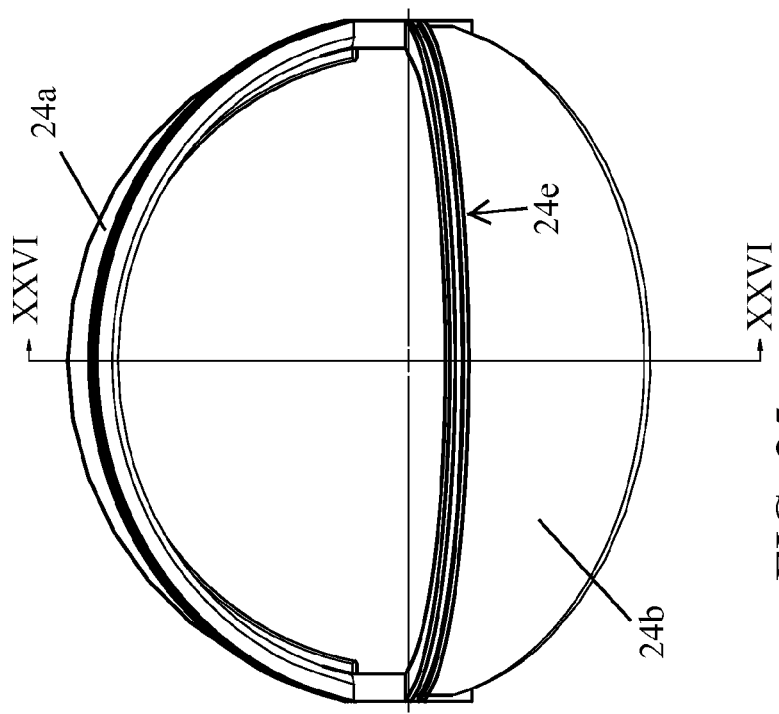
FIG. 25 is a front elevation view of the spherical body of FIG. 23.
Figure 26:
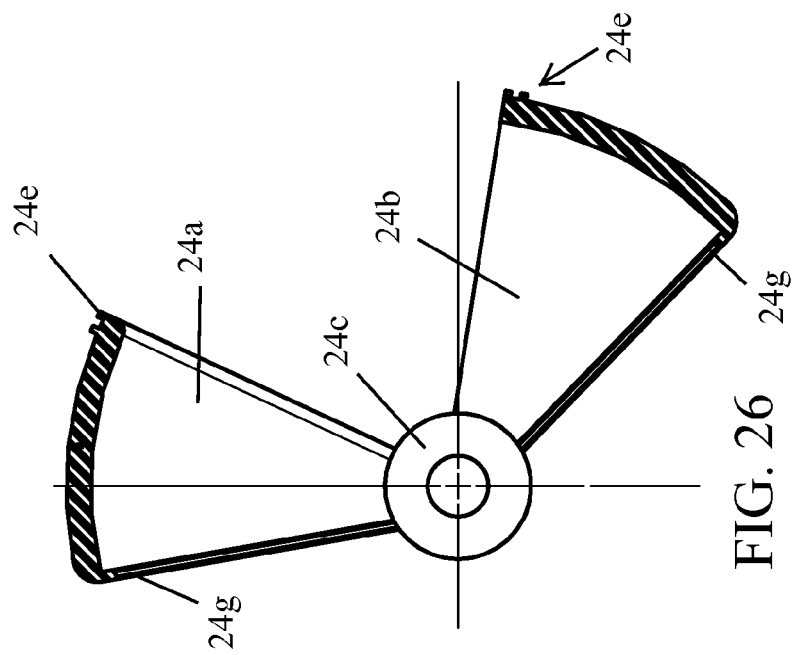
FIG. 26 is a cross-section view taken along line XXVI-XXVI of FIG. 25.

Referring to FIGS. 19-22, spherical body 22 similarly includes an upper spherical section 22a and lower spherical section 22b, which are joined by annular members 22c, each with a central opening 22d. Spherical sections 22a and 22b each include a rib 22e with a recess 22f for receiving a seal 32a. As best seen in FIG. 22, spherical sections 22a and 22b each include an inwardly projecting rib 22g, which provide stops when abutting rib 20f of spherical sector 20.

Referring to FIGS. 23-26, spherical body 24 also includes an upper spherical sector 24a and a lower spherical sector 24b, which are interconnected by a pair of annular members 24c each with a central opening 24d to align with the openings 22d, 20d, and 50 of the respective underlying spherical bodies. Similarly, spherical sectors 24a and 24b each include a projecting rib 24e with a recess 24f for retaining seal 34a on spherical body 24. Again, each spherical sector includes an inwardly projecting rib 24g, which provides stops for spherical body 24 when spherical body 24 is moved against and abuts rib 22e of spherical member 22.

Referring to FIGS. 10-13, pipe section 14 includes spherical body 26 with a pair of annular tabs 26c each with a central opening 26d for aligning with their respective openings of the underlying spherical bodies. In this manner, when each of the spherical bodies are positioned such that their respective openings are aligned, the pivot bolts may be inserted into the aligned openings on each side of the monitor to thereby pivotally secure pipe section 14 and its pivotal connection to pipe section 12 in place. Further, spherical body 26 includes on its inwardly facing surface an inwardly projecting rib 26g, which provides stops when abutting projecting rib 24e of spherical body 24.

In this manner, when each of the spherical bodies are moved relative to the other spherical bodies, their respective inwardly facing ribs provide stops to limit their respective ranges of motion with the total of their ranges of motion allowing the outlet 14a of pipe 14 to be either lowered to its lowermost position as shown in FIG. 5 or raised to its most raised position or elevated position as shown in FIG. 6. Thus, monitor 10 provides a monitor with a single pivot axis that allows a far greater range of motion than heretofore known using a single horizontal pivot axis. Further, as can be appreciated from FIGS. 4, 5, and 6, the flow path through the monitor is substantially unobstructed and generally subject to at most two bends in most configurations subject to only a single bend, which significantly reduces the friction and energy loss in the fluid flow through the monitor.

Furthermore, as noted each of the components forming monitor 10 may be molded using any permanent mold process, such as injection molding, using the plastic, including a reinforcement polymer, such as glass-filled nylon or the like. Thus, monitor 10 may provide a light weight cost efficient monitor. Though it should be understood that the components forming monitor 10 may be formed from a metal, such as a powdered metal or an investment cast metal. Further, with the nested arrangement of spherical pivot surfaces, the monitor has a compact configuration, which may be particularly suitable in truck mounted or aerial mounted arrangements where the size of the monitor may be important. Further, when molded from a plastic material, the weight of the monitor may be drastically reduced.

Figure 28:
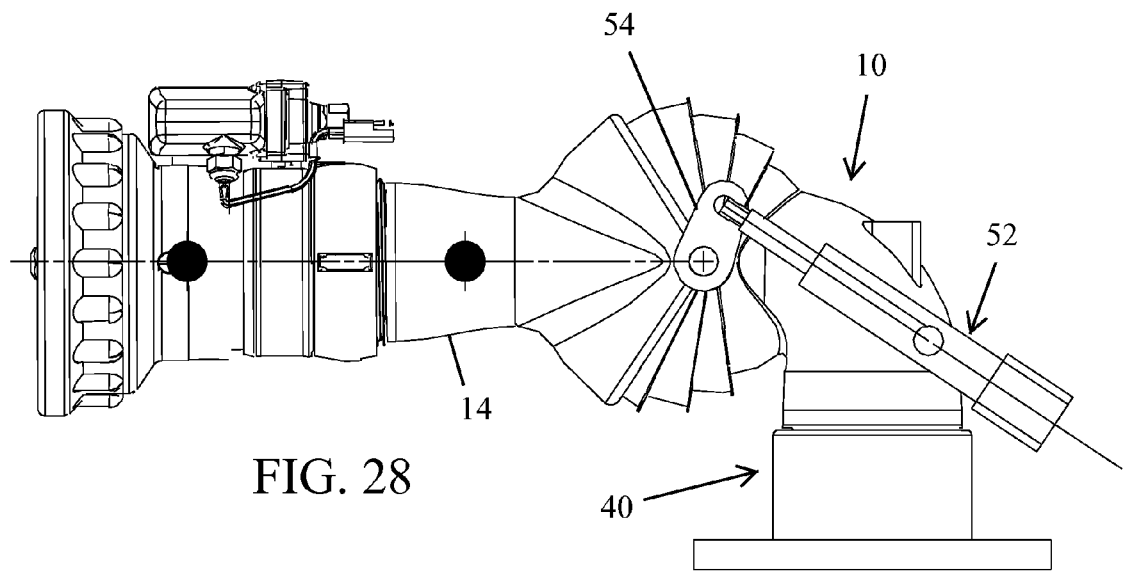
FIGS. 28 and 29 illustrate the movement of the monitor illustrating the movement of the outlet of the monitor of FIG. 27.
Figure 27:
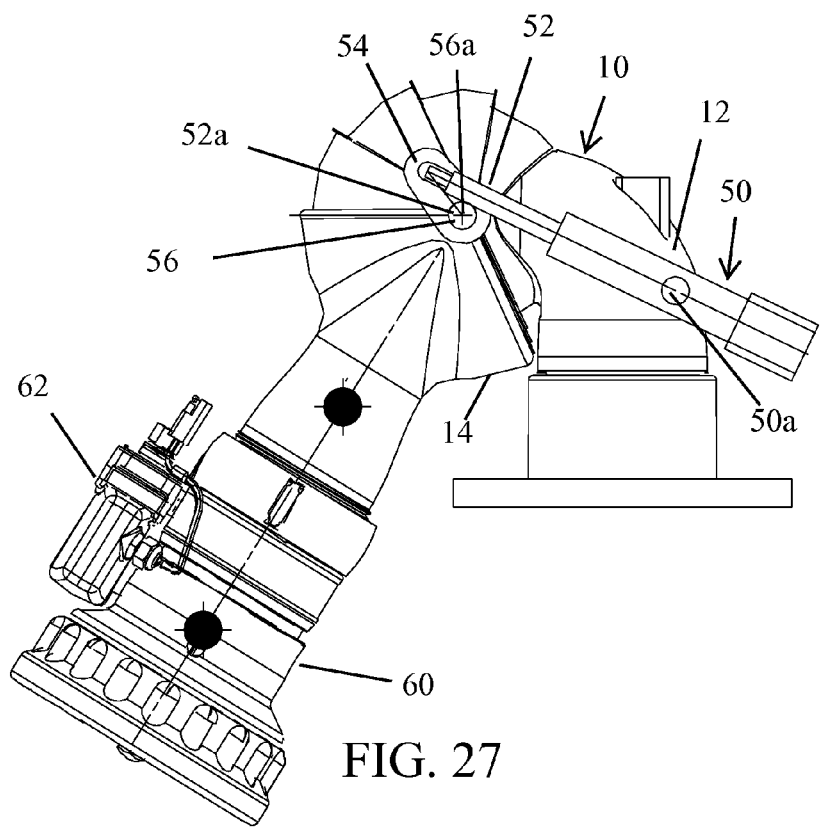
FIG. 27 is a side elevational view of the monitor of FIG. 1 provided with an actuator for moving the outlet of the monitor.
Figure 29:
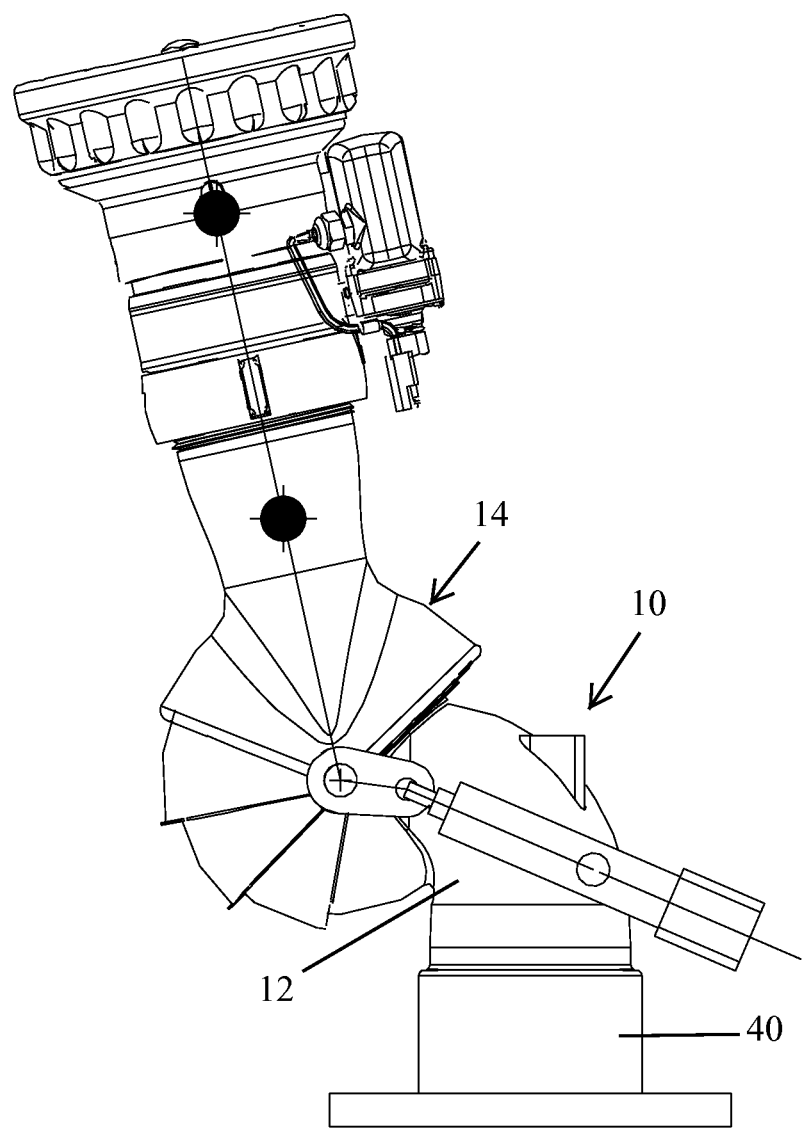
Figures 30, 31:
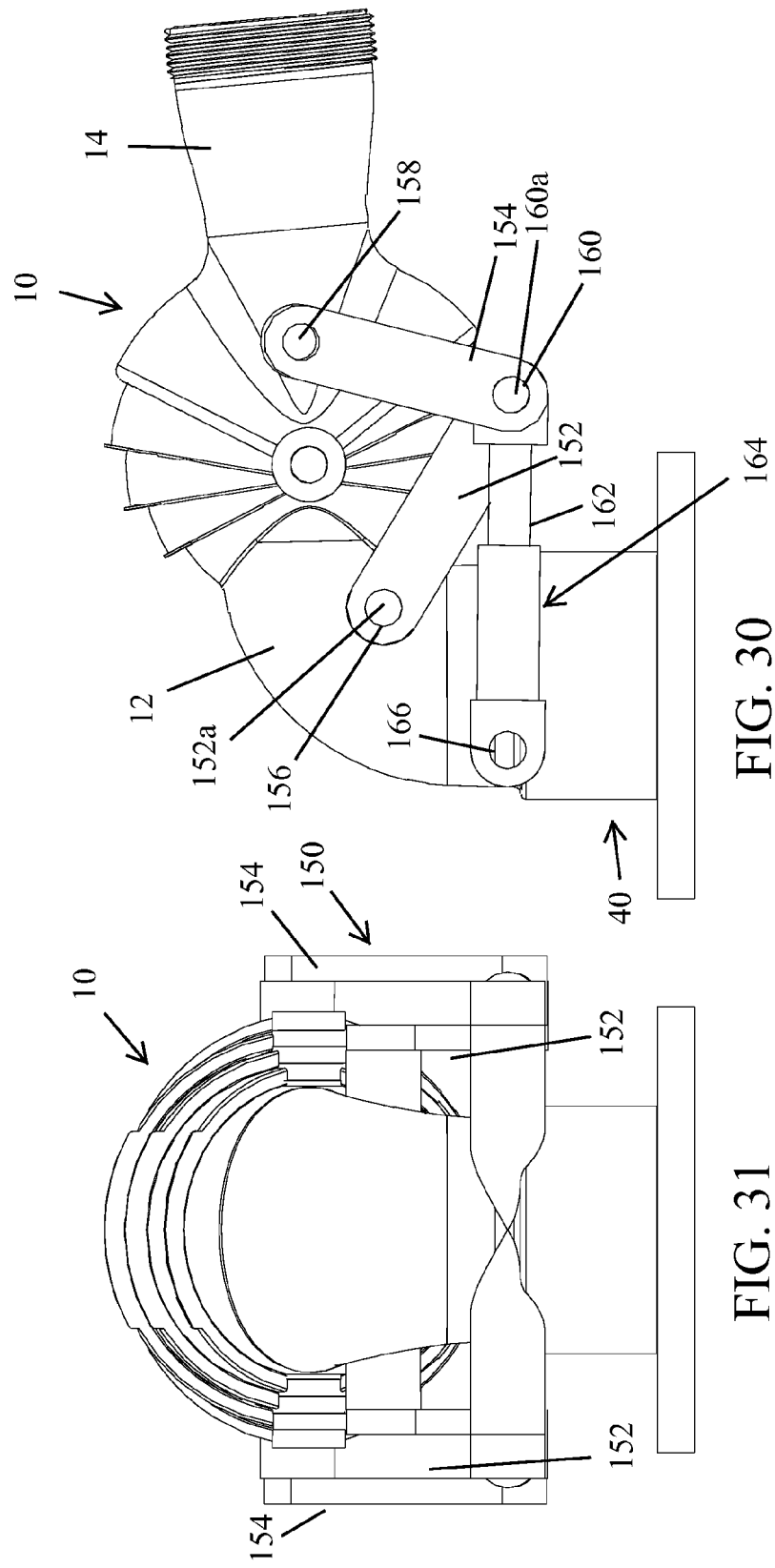
FIG. 30 is an elevation view of the monitor of FIG. 1 with an alternate embodiment of an actuator for moving the outlet of the monitor.
FIG. 31 is a rear elevation view of the monitor of FIG. 30.

Referring to FIGS. 27-29, monitor 10 may incorporate an actuator 50, such as a linear actuator, to move the outlet. In the illustrated embodiment, actuator 50 comprises a linear actuator with an extendible member or portion 52 and is pinned at one end to first pipe section 12 at axis 50a, with extendable member coupled at its distal end 52a to a cam linkage 54 mounted to second pipe section 14, which forms the outlet of the monitor. Cam linkage 54 is fixedly mounted to second pipe section 14 by a pin 56 so that when cam 54 is pushed by actuator 52, cam 54 will induce rotation of second pipe section 14 about pivot axis 56a. For example, a suitable actuator may comprise an electrically powered linear actuator including a drive screw or may comprise a pneumatic actuator or fluid actuator, such as a cylinder.

Further, as will be appreciated, a nozzle 60 may mounted to second pipe section 14, which may also include an actuator 62 for controlling the flow of the fluid through the nozzle. Actuator 62 may comprise an electrically powered actuator and, further, which may be controlled using RF signals.

Figure 33:
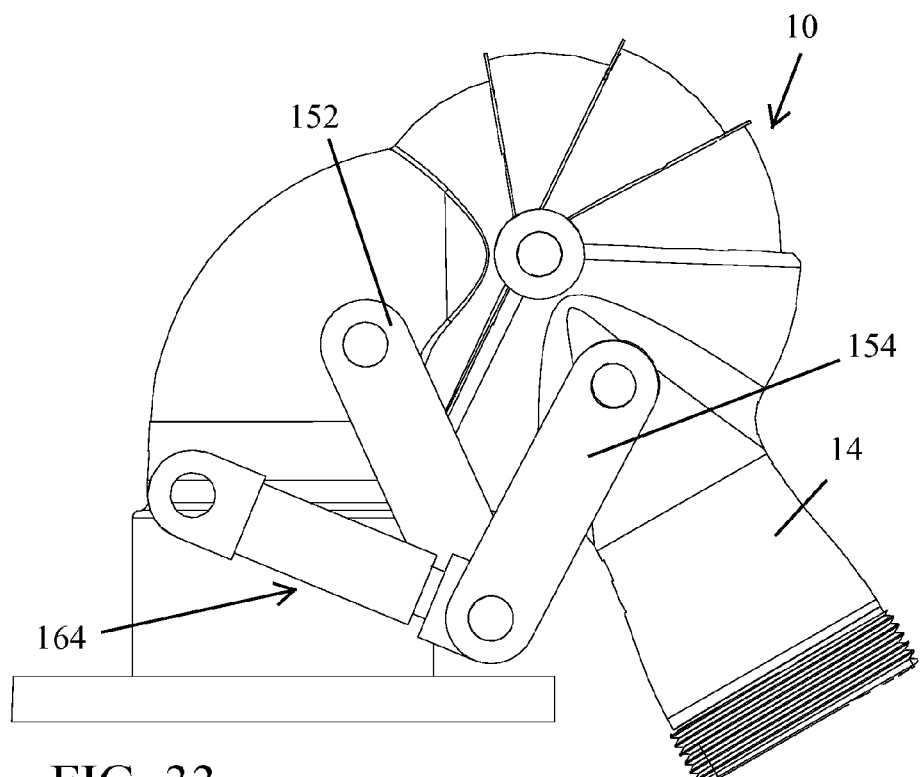
Figure 32:
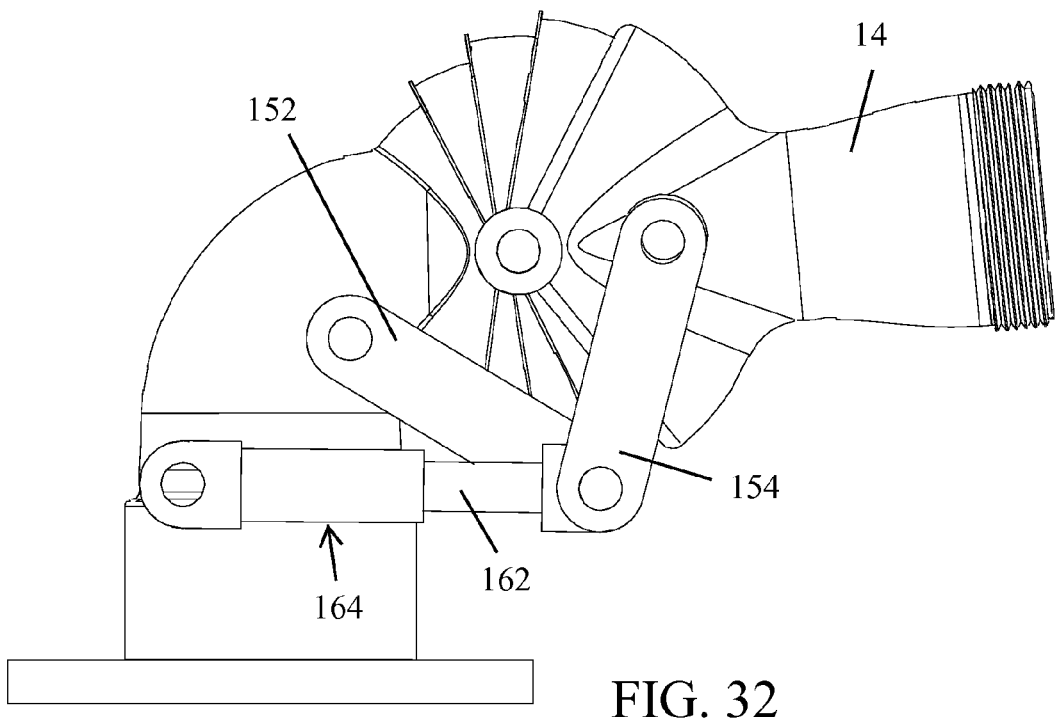

Referring to FIGS. 30-34, the numeral 150 generally designates another embodiment of an actuator that may be used to move second pipe section form its lower position such as shown FIG. 33 to its fully raised position, such as shown in FIG. 34. Actuator 150 includes a pair of linkage arms 152 and 154. Linkage arm 152 is pivotally mounted to first pipe section 12 by a pin or shaft about a pivot axis 152a, while linkage arm 154 is fixedly mounted to second pipe section 14 by a pin or shaft 156. Linkage arms 152 and 154 are joined at their distal ends by a pivot shaft 160 about a pivot axis 160a, which extends through the extendable arm 162 of a linear actuator 164. The proximal end of actuator 164 is pivotally mounted to first pipe section 12 about a pivot shaft or pin 166, which his secured rigidly fixed to first pipe section 12 above monitor base 40. When the extendable member 162 of actuator 164 is extended or retracted, second pipe section 14 will be moved between its lowered position (see FIG. 33) to its generally horizontal position, shown in FIG. 32 to its raised position, shown in FIG. 34.

Referring again to FIG. 31, actuator 150 optionally includes a pair of linkages with a first set of linkages mounted to the right side of the monitor shown in FIG. 31 and a second set of linkages and actuator mounted to the opposed side of the monitor to thereby reduce any bending forces that may occur in the monitor when the monitor is moved between its lowered to its raised positions.

As noted, it should be understood that the actuators may be electrically powered linear actuators or may comprise manually operated actuators, including a hand wheel screw.

Figure 36:
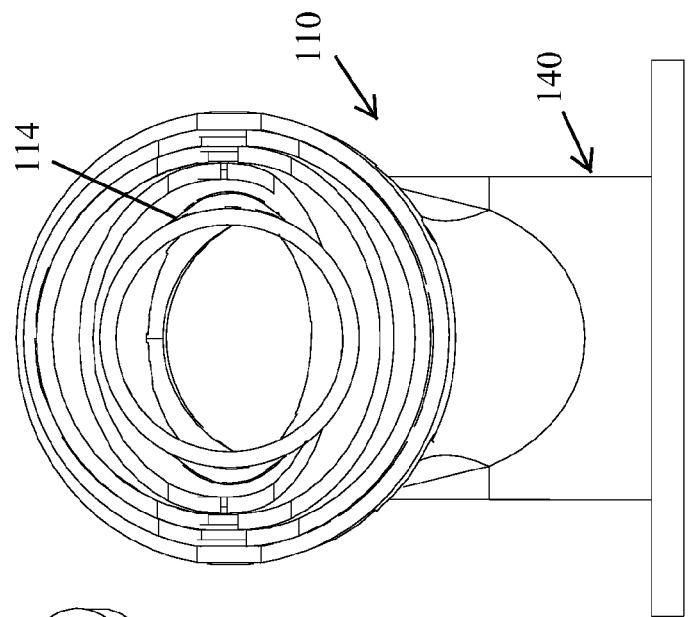
FIG. 36 is a front end elevation view of the monitor of FIG. 35.

Referring to FIGS. 35 and 36, the numeral 110 generally designates another embodiment of the monitor of the present invention. Monitor 110 similarly includes a first pipe section 112 and a second pipe section 114, which forms the outlet of the monitor. In the illustrated embodiment, first pipe section 112 is integrally formed with base 140. Further, monitor 110 similarly includes a plurality of nesting pipe segments 118, 120, and 122, which are nested similar to the pipe segments described in reference to the first embodiment; however, rather than increasing in diameter the pipe segments 118, 120, and 122 decrease in diameter with the spherical portion of pipe section 114 nested in pipe section 122. Each segment is also similarly sealed with the overlapping segment to form a sealed passageway. Further, each segment is similarly commonly mounted to a pivot pin or pivot shaft 116 so that the second pipe section 114 which forms the outlet of the nozzle body may be moved in a similar manner to the first embodiment.

Figure 40:
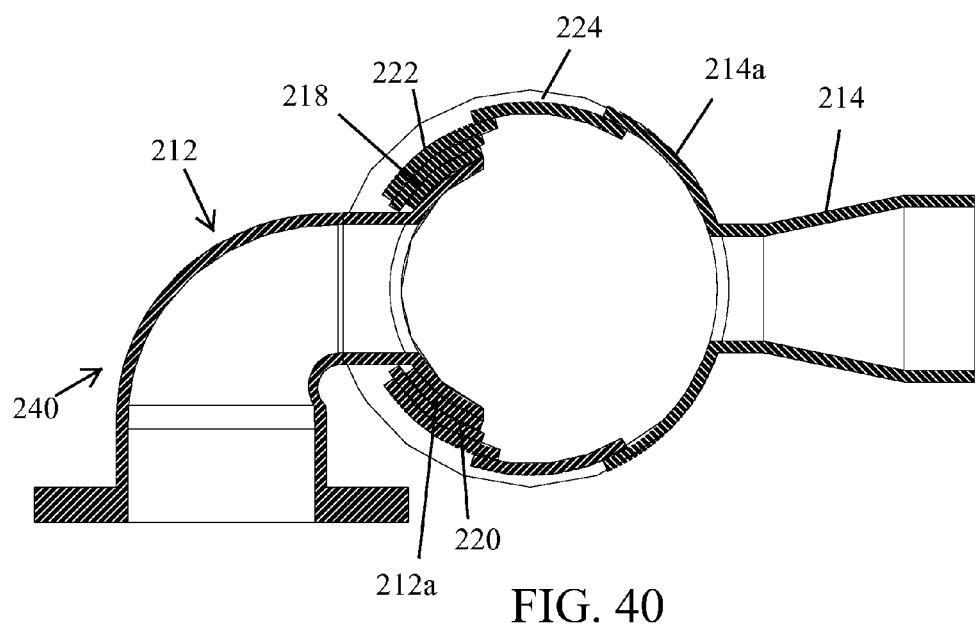
FIG. 40 is a cross-section view taken along line XXXI-XXXI of FIG. 38.

Referring to FIGS. 37-40, the numeral 210 generally designates a third embodiment of the monitor of the present invention. In the illustrated embodiment, monitor 210 is formed from a plurality of cylindrical-shaped pipe sections, which are nested as shown in FIG. 40. As best seen in FIG. 40, monitor 210 includes a first pipe section 212 and a second pipe section 214, which forms the outlet of the monitor and in similar fashion to the previous embodiments. Further, the overlapping cylindrical pipe sections, namely sections 218, 220, 222, and 224, are nested, with the cylindrical pipe section 214a of second pipe section 214 being mounted over cylindrical pipe section 224 in a similar manner to the first embodiment.

Figure 37:
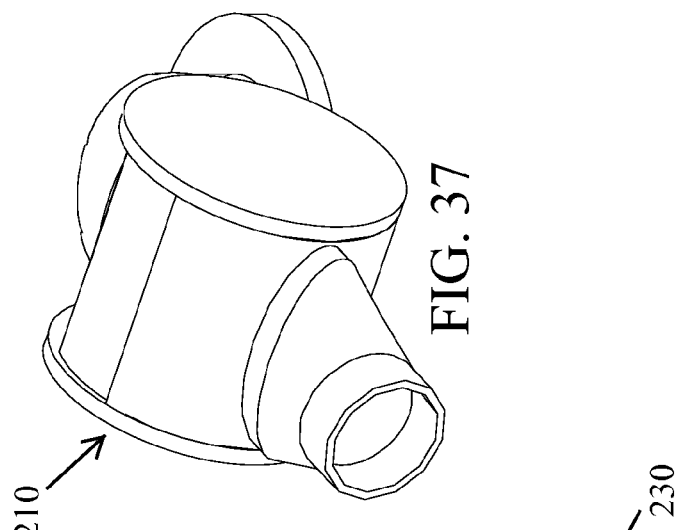
FIG. 37 is a perspective view of the third embodiment of the monitor of the present invention.
Figure 39:
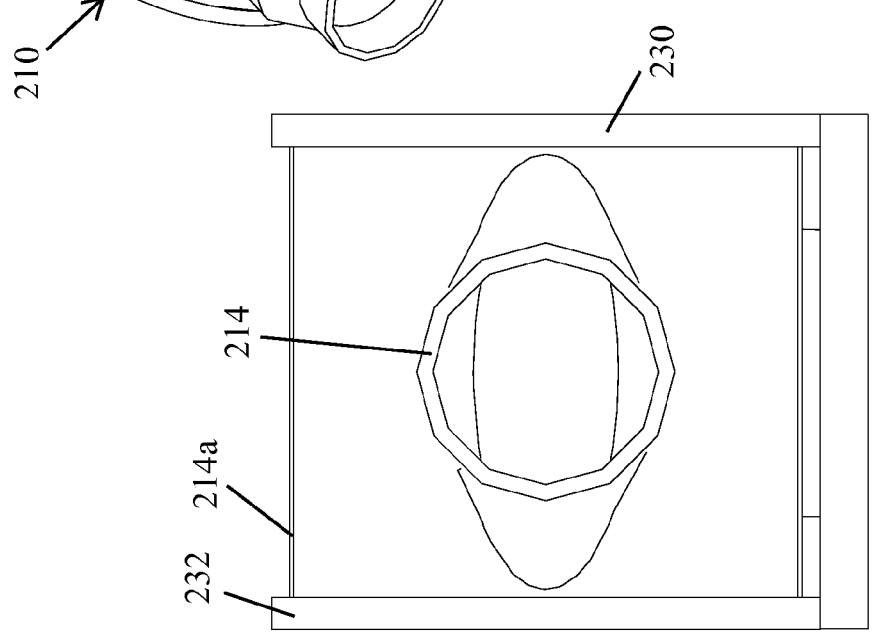
FIG. 39 is a front end elevation view of the monitor of FIG. 37.
Figure 38:
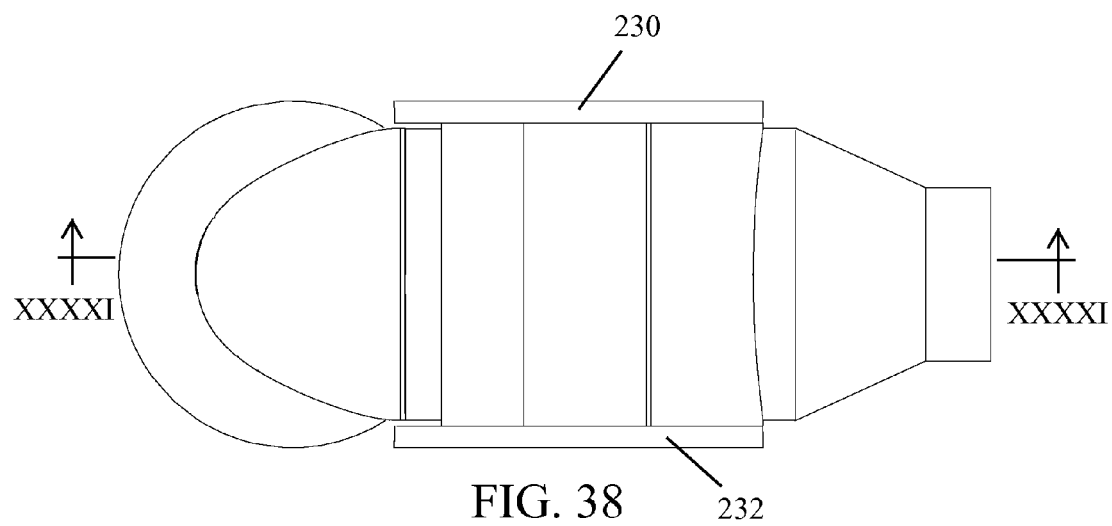
FIG. 38 is a top pan view of the monitor of FIG. 37.

As best understood from FIGS. 37 and 38, the cylindrical pipe sections 218-224, as well as the cylindrical pipe sections 212a, 214a of first and second pipe section 21, 214 are mounted between a pair of opposed flanges 230 and 232, for example, in tracks, which may be sealed to provide a sealed passageway through the monitor. Similar to the previous embodiment, first pipe section 212 is integrally formed with base 240. Though, it should be understood that a separate base may be provided for monitor 210 or for monitor 110. As would be understood therefore, with this latter embodiment, additional sealing surfaces may be required, not only between each of the respective cylindrical pipe sections but also between the pipe sections and flanges 230 and 232.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property right or privilege is claimed are defined as follows:

1. A fire fighting monitor comprising:
   a first pipe having an inlet and an outlet, said first pipe having a passageway with a central axis, said passageway extending from said inlet to said outlet, said passageway having a curved portion wherein said outlet directs the flow of fluid in a direction angled to said flow of fluid into said inlet; and
   a second pipe mounted about said outlet of said first pipe, said second pipe pivotally mounted by at least one pivot along a pivot axis, said pivot axis being located at said outlet of said first pipe, and said second pipe having an outlet in fluid communication with said outlet of said first pipe and being pivotal about said pivot axis over a range of motion greater than 90°;
   wherein said outlet of said first pipe has a spherical body, and said second pipe including a spherical body for mounting about said outlet of said first pipe; and a spherical body interposed between said second pipe and said first pipe.

2. The fire fighting monitor according to claim 1, wherein said spherical body of said second pipe has an inner diameter, said spherical body of said first pipe having an outer diameter, said inner diameter of said spherical body of said second pipe being different than said outer diameter of said first pipe.

3. The fire fighting monitor according to claim 1, further comprising a plurality of overlapping spherical bodies interposed between said second pipe and said first pipe.

4. The fire fighting monitor according to claim 1, wherein said outlet of said second pipe is pivotal about said pivot axis over a range of motion greater than 120°.

5. The fire fighting monitor according to claim 1, wherein said outlet of said second pipe is pivotal about said pivot axis over a range of motion greater than 135°.

6. The fire fighting monitor according to claim 1, wherein the curved portion has a curved profile in a plane normal to the pivot axis.

7. The fire fighting monitor according to claim 1, wherein the pivot axis is normal to a flow direction of the fluid at the outlet of the first pipe.

8. The fire fighting monitor according to claim 1, wherein said at least one pivot comprises a pin.

9. The fire fighting monitor according to claim 1, wherein said at least one pivot comprises a shaft.

10. The fire fighting monitor according to claim 1, wherein said at least one pivot comprises a bolt.

11. The fire fighting monitor according to claim 1, wherein said second pipe includes a linear passageway in fluid communication with said curved portion of said passageway of said first pipe, said linear passageway and said curved portion of said passageway of said first pipe forming a flow path through the monitor having no more than two bends to thereby reduce friction losses in the fluid flowing through the monitor.

12. The fire fighting monitor of claim 1, wherein said first pipe is formed from a molded component.

13. The fire fighting monitor of claim 12, wherein said second pipe is formed from a second molded component.

14. The fire fighting monitor of claim 13, wherein said molded component and said second molded component are both molded from a plastic material.

15. The fire fighting monitor of claim 14, wherein said plastic material comprises a composite material.

16. The fire fighting monitor of claim 15, wherein said composite material comprises a reinforced nylon such as a glass filled nylon.

17. The fire fighting monitor of claim 12, wherein said molded component comprises a component molded from a plastic material.

18. The fire fighting monitor of claim 17, wherein said plastic material comprises a composite material.

19. The fire fighting monitor of claim 18, wherein said composite material comprises a reinforced nylon such as a glass filled nylon.

20. The fire fighting monitor of claim 12, wherein said molded component comprises a component molded from a metal.

21. A fire fighting monitor comprising:
a housing having an inlet about a generally vertical pivot axis and an outlet, said housing having a passageway with a central axis and a single generally horizontal pivot axis, said passageway extending from said inlet to said outlet, said passageway having a curved portion wherein said outlet directs a flow of fluid in a direction angled to said generally vertical pivot axis, and said outlet being pivotal about at least one pivot along said single generally horizontal pivot axis over a range of greater than 90°;
a nozzle mounted to said outlet, wherein said nozzle is pivotal about said single generally horizontal pivot axis and is pivotal with said outlet over said range;
said housing includes a first pipe and a second pipe, said first pipe including said inlet, and said second pipe including said outlet; and a plurality of overlapping spherical bodies interposed between said second pipe and said first pipe, said overlapping spherical bodies forming a pivot joint between said first pipe and said second pipe.

22. The fire fighting monitor according to claim 21, wherein said outlet is pivotal about said single generally horizontal pivot axis over a range of motion greater than 120°.

23. The fire fighting monitor according to claim 21, wherein said outlet is pivotal about said single generally horizontal pivot axis over a range of motion greater than 135°.

24. The fire fighting monitor according to claim 21, wherein said at least one pivot comprises a pin.

25. The fire fighting monitor according to claim 21, wherein said at least one pivot comprises a shaft.

26. The fire fighting monitor according to claim 21, wherein said at least one pivot comprises a bolt.

27. The fire fighting monitor of claim 21, wherein said passageway forming a flow path through the monitor having no more than two bends to thereby reduce friction losses in the fluid flowing through the monitor.

28. The fire fighting monitor of claim 21, wherein said housing is formed from one or more molded components.

29. The fire fighting monitor according to claim 28, wherein said one or more molded components comprises a component molded from a plastic material.

30. The fire fighting monitor according to claim 28 wherein said plastic material comprises a composite material.

31. The fire fighting monitor according to claim 28, wherein said composite material comprises a reinforced nylon such as a glass filled nylon.

32. The fire fighting monitor according to claim 28, wherein said one or more molded components comprises a component molded from a metal.

* * * * *

UNITED STATES PATENT AND TRADEMARK OFFICE
CERTIFICATE OF CORRECTION

PATENT NO.        : 9,067,092 B2
APPLICATION NO.   : 12/436422
DATED             : June 30, 2015
INVENTOR(S)       : Eric N. Combs Page 1 of 1

It is certified that error appears in the above-identified patent and that said Letters Patent is hereby corrected as shown below:

In the Claims:

Claim 30, Column 10, Line 23, please change the dependency from claim 28 to claim 29

Claim 31, Column 10, Line 25, please change the dependency from claim 28 to claim 30

Signed and Sealed this
Fifteenth Day of March, 2016

Michelle K. Lee
*Director of the United States Patent and Trademark Office*